(12) United States Patent
Danley et al.

(10) Patent No.: US 9,085,047 B2
(45) Date of Patent: *Jul. 21, 2015

(54) COATING REMOVAL SYSTEMS FOR OPTICAL FIBERS

(71) Applicant: CORNING OPTICAL COMMUNICATIONS LLC, Hickory, NC (US)

(72) Inventors: Jeffrey Dean Danley, Hickory, NC (US); Robert Bruce Elkins, II, Hickory, NC (US); Darrin Max Miller, Hickory, NC (US); Zhaoxu Tian, Hickory, NC (US); Stephan T Toepper, Hickory, NC (US); Kipp David Yeakel, Waverly, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/281,980

(22) Filed: May 20, 2014

(65) Prior Publication Data

US 2014/0332510 A1     Nov. 13, 2014

Related U.S. Application Data

(63) Continuation-in-part of application No. 13/891,691, filed on May 10, 2013, now Pat. No. 8,755,654.

(51) Int. Cl.
*G02B 6/26*     (2006.01)
*B23K 26/36*     (2014.01)
*B23K 26/38*     (2014.01)
(Continued)

(52) U.S. Cl.
CPC .......... *B23K 26/365* (2013.01); *B23K 26/0639* (2013.01); *B23K 26/08* (2013.01); *B23K 26/38* (2013.01); *B23K 26/407* (2013.01); *G02B 6/245* (2013.01); *G02B 6/25* (2013.01);
(Continued)

(58) Field of Classification Search
None
See application file for complete search history.

(56) References Cited

U.S. PATENT DOCUMENTS

| 4,147,402 A | 4/1979 | Chown ........................ 350/96.18 |
| 4,345,930 A | 8/1982 | Basola et al. .................... 65/102 |

(Continued)

FOREIGN PATENT DOCUMENTS

| WO | 01/61394 A1 | 8/2001 | .............. G02B 6/26 |
| WO | 01/61395 A1 | 8/2001 | .............. G02B 6/26 |

(Continued)

OTHER PUBLICATIONS

U.S. Appl. No. 13/769,557, filed Feb. 18, 2013, 19 pages.

*Primary Examiner* — Sung Pak

(57) ABSTRACT

Coating removal systems for optical fibers are disclosed. Related methods and optical fibers processed with these methods and coating removal systems are also disclosed. An optical fiber includes a glass fiber, having a cladding and core, surrounded by a protective coating which does not contribute to the optical performance of the optical fiber. By removing the coating at an end portion of the optical fiber, the end portion may be precisely positioned and secured to enable reliable optical communications. A laser beam may be directed at the protective coating to remove the protective coating by one or more ablating, melting, vaporizing, and/or thermal decomposing processes. The optical fiber may also be optionally cleaved. In this manner, the coating may be efficiently removed while retaining at least fifty percent of the tensile strength of the optical fiber.

20 Claims, 17 Drawing Sheets

(51) Int. Cl.
*G02B 6/245* (2006.01)
*B23K 26/40* (2014.01)
*B23K 26/06* (2014.01)
*B23K 26/08* (2014.01)
*G02B 6/38* (2006.01)
*G02B 6/25* (2006.01)

(52) U.S. Cl.
CPC ........... *G02B 6/3833* (2013.01); *G02B 6/3855* (2013.01); *G02B 6/3863* (2013.01)

(56) References Cited

U.S. PATENT DOCUMENTS

| | | | |
|---|---|---|---|
| 4,510,005 A | 4/1985 | Nijman | 156/221 |
| 4,678,268 A | 7/1987 | Russo et al. | 350/96.18 |
| 4,859,827 A | 8/1989 | Coyle, Jr. et al. | 219/121.64 |
| 4,932,989 A | 6/1990 | Presby | 65/2 |
| 5,011,254 A | 4/1991 | Edwards et al. | 350/96.18 |
| 5,101,090 A | 3/1992 | Coyle, Jr. et al. | 219/121.64 |
| 5,226,101 A | 7/1993 | Szentesi et al. | 385/85 |
| 5,256,851 A | 10/1993 | Presby | 219/121.69 |
| 5,291,570 A | 3/1994 | Filgas et al. | 385/78 |
| 5,317,661 A | 5/1994 | Szentesi et al. | 385/85 |
| 5,421,928 A | 6/1995 | Knecht et al. | 156/153 |
| 5,772,720 A | 6/1998 | Taira-Griffin et al. | 65/387 |
| 5,954,974 A | 9/1999 | Broer et al. | 216/2 |
| 5,966,485 A | 10/1999 | Luther et al. | 385/85 |
| 6,139,196 A | 10/2000 | Feth et al. | 385/97 |
| 6,246,026 B1 | 6/2001 | Vergeest | 219/121.72 |
| 6,282,349 B1 | 8/2001 | Griffin | 385/81 |
| 6,361,219 B1 | 3/2002 | Blyler, Jr. et al. | 385/85 |
| 6,413,450 B1 | 7/2002 | Mays, Jr. | 264/1.27 |
| 6,509,547 B1 | 1/2003 | Bernstein et al. | 219/121.68 |
| 6,534,741 B2 | 3/2003 | Presby | 219/121.69 |
| 6,653,592 B2 | 11/2003 | Andersen | 219/121.68 |
| 6,738,544 B2 | 5/2004 | Culbert et al. | 385/33 |
| 6,742,936 B1 | 6/2004 | Knecht et al. | 385/67 |
| 6,754,416 B1 | 6/2004 | Mitchell et al. | 385/37 |
| 6,774,341 B2 | 8/2004 | Ohta | 219/121.72 |
| 6,805,491 B2 | 10/2004 | Durrant et al. | 385/76 |
| 6,817,785 B2 | 11/2004 | Tian | 385/96 |
| 6,822,190 B2 | 11/2004 | Smithson et al. | 219/121.69 |
| 6,825,440 B2 | 11/2004 | Ohta et al. | 219/121.69 |
| 6,886,991 B2 | 5/2005 | Endo | 385/78 |
| 6,888,987 B2 | 5/2005 | Sercel et al. | 385/39 |
| 6,902,327 B1 | 6/2005 | Johnson | 385/60 |
| 6,939,055 B2 | 9/2005 | Durrant et al. | 385/76 |
| 6,951,994 B2 | 10/2005 | Mays, Jr. | 219/121.67 |
| 6,955,478 B2 | 10/2005 | Durrant et al. | 385/76 |
| 6,957,920 B2 | 10/2005 | Luther et al. | 385/85 |
| 6,960,627 B2 | 11/2005 | Huth et al. | 525/59 |
| 6,963,687 B2 | 11/2005 | Vergeest et al. | 385/123 |
| 6,968,103 B1 | 11/2005 | Schroll et al. | 385/30 |
| 7,023,001 B2 | 4/2006 | Cournoyer et al. | 250/492.1 |
| 7,029,187 B2 | 4/2006 | Chapman et al. | 385/96 |
| 7,082,250 B2 | 7/2006 | Jones et al. | 385/134 |
| 7,142,741 B2 | 11/2006 | Osborne | 385/15 |
| 7,147,384 B2 | 12/2006 | Hardcastle et al. | 385/60 |
| 7,216,512 B2 | 5/2007 | Danley et al. | 65/392 |
| 7,264,403 B1 | 9/2007 | Danley et al. | 385/60 |
| 7,267,491 B2 | 9/2007 | Luther et al. | 385/85 |
| 7,306,376 B2 | 12/2007 | Scerbak et al. | 385/76 |
| 7,324,723 B2 | 1/2008 | Shioda et al. | 385/31 |
| 7,324,724 B2 | 1/2008 | Levesque et al. | 385/31 |
| 7,377,700 B2 | 5/2008 | Manning et al. | 385/72 |
| 7,419,308 B2 | 9/2008 | Ma | 385/54 |
| 7,509,004 B2 | 3/2009 | Coleman | 385/33 |
| 7,540,668 B2 | 6/2009 | Brown | 385/78 |
| 7,630,609 B1 | 12/2009 | Mays, Jr. et al. | 385/137 |
| 7,695,201 B2 | 4/2010 | Douglas et al. | 385/85 |
| 7,802,927 B2 | 9/2010 | Benjamin et al. | 385/88 |
| 7,947,921 B2 | 5/2011 | McFall et al. | 219/121.69 |
| 8,052,836 B2 | 11/2011 | Cale et al. | 156/712 |
| 8,101,885 B2 | 1/2012 | Nakamae et al. | 219/121.77 |
| 8,104,974 B1 | 1/2012 | Gurreri | 385/72 |
| 8,109,679 B2 | 2/2012 | Danley et al. | 385/85 |
| 8,132,971 B2 | 3/2012 | Luther et al. | 385/83 |
| 8,755,654 B1 * | 6/2014 | Danley et al. | 385/43 |
| 2004/0234211 A1 | 11/2004 | Durrant et al. | 385/88 |
| 2005/0008307 A1 | 1/2005 | Culbert et al. | 385/123 |
| 2005/0284852 A1 | 12/2005 | Vergeest et al. | 219/121.67 |
| 2006/0137403 A1 | 6/2006 | Barr et al. | 65/377 |
| 2006/0266743 A1 | 11/2006 | Chi et al. | 219/121.69 |
| 2008/0067158 A1 | 3/2008 | Levesque | 219/121.72 |
| 2010/0101277 A1 | 4/2010 | Gonthier et al. | 65/392 |
| 2010/0215319 A1 | 8/2010 | Childers et al. | 385/60 |
| 2010/0303416 A1 | 12/2010 | Danley et al. | 385/55 |
| 2012/0014649 A1 | 1/2012 | Duis et al. | 385/65 |
| 2012/0027356 A1 | 2/2012 | Gurreri | 385/60 |
| 2012/0027358 A1 | 2/2012 | Webb et al. | 385/78 |
| 2013/0089294 A1 | 4/2013 | Zimmel | 385/80 |

FOREIGN PATENT DOCUMENTS

| | | | |
|---|---|---|---|
| WO | 01/61870 A2 | 8/2001 | |
| WO | 2004/003612 A1 | 1/2004 | G02B 6/25 |
| WO | 2008/103239 A1 | 8/2008 | B23K 26/00 |

* cited by examiner

COATING REMOVAL SYSTEMS FOR OPTICAL FIBERS

PRIORITY APPLICATION

This application is a continuation-in-part of U.S. patent application Ser. No. 13/891,691, filed on May 10, 2013, the content of which is relied upon and incorporated herein by reference in its entirety, and the benefit of priority under 35 U.S.C. §120 is hereby claimed.

BACKGROUND

1. Field of the Disclosure

The field of the disclosure relates generally to optical fibers, and more specifically to a system for removing a polymer coating overlaying a glass optical fiber, such as during preparation of the optical fiber for attachment of a connector to the optical fiber.

2. Technical Background

Benefits of optical fibers include extremely wide bandwidth and low noise operation. In cases where high bandwidth is required between two interconnection locations, fiber optic cables having fiber optic connectors may be used to communicate information between these locations. The fiber optic connectors also may be used to conveniently connect and disconnect the fiber optic cables from the interconnection locations when maintenance and upgrades occur.

Each of the fiber optic connectors may include a ferrule assembly having a ferrule. The ferrule has several purposes. The ferrule includes an internal pathway, called a ferrule bore, through which an optical fiber is supported and protected. The ferrule bore also includes an opening at an end face of the ferrule. The opening is where an optical surface of an end portion of the optical fiber may be located to be aligned to an end portion of another optical fiber of a complementary connector. The end portions of the optical fibers need to be precisely aligned to establish an optical connection so that the optical cores of the optical fibers may communicate.

The optical fibers typically include a glass fiber (e.g., cladding and core) surrounded by a protective polymer coating which for several reasons is removed from the glass fiber prior to being disposed within the ferrule. One reason is that the polymer coatings do not currently have the robust mechanical properties necessary to be attached to the ferrule bore to withstand the cyclical tension experienced during the use of the fiber optic optic connector over time without displacement creep or breakage. Another reason is that the optical fiber is not centered within the polymer coating with sufficient accuracy to permit the glass fiber to be precisely located within the ferrule bore without removing the coating.

Various methods are available to remove the polymer coating from an end portion of the optical fiber: hot gas stripping, mechanical stripping, chemical stripping, and laser stripping. All of these methods have drawbacks. Hot-gas stripping uses a heated jet of gas (e.g., nitrogen or air) to melt and remove the coating, but often considerable debris is created. The hot-gas stripping approach may also incompletely evaporate the polymer coating, and/or may overheat heat-sensitive materials in close proximity to the fiber core.

Mechanical stripping of optical fibers includes physically removing the polymer coating material from the glass fiber with a semi-sharp edge of a stripping blade made of a metal or a polymer, as may be similar to mechanical stripping of electrical wires. However, mechanical stripping may have issues because the optical fiber may be damaged and extensive consumables (e.g., stripping blades) are needed that require time-consuming procedures to inspect and replace consumables as needed in an operations environment. Chemical stripping of optical fibers uses chemicals to dissolve the polymer coating from the glass portion of the optical fiber, but these chemicals require extensive procedures to protect the environment and safety measures to protect personnel.

Laser stripping utilizes one or more laser beams to strip the polymer coatings from glass optical fibers using a vaporization or ablation process. As is depicted in FIG. 1, laser stripping may include a laser beam 10 to ablate a coating 12 from a glass portion 14 of an optical fiber 16 prior to laser cleaving. The laser beam 10 may be incident on the optical fiber directly or may be focused upon the optical fiber 16 with a complex reflector 18. However, conventional laser stripping techniques may have issues such as weakening optical fibers so that they have difficulty withstanding tensile forces experienced when used with fiber optic connectors. Moreover, conventional laser techniques may also be too slow requiring physical movement of the optical fiber relative to the laser. Conventional laser stripping techniques also may not fully remove the coating from the optical fiber, and so inadequately stripped coating portions may obstruct the optical fiber from being inserted through a ferrule of a fiber optic connector. Further, conventional laser processing equipment also has a large footprint and, in combination with laser cleaving machines, occupy large areas of expensive manufacturing space.

What is desired is a coating removal system and process which preserves the tensile strength of the optical fiber. The system and process should uniformly remove the coating from the optical fiber while minimizing the risk of damage to the optical fiber. The system and method should not require extensive consumables or chemicals, and should not have a large manufacturing footprint.

SUMMARY

Embodiments disclosed herein include coating removal systems for optical fibers. Related methods and optical fibers processed with these methods and coating removal systems are also disclosed. An optical fiber includes a glass fiber, having a cladding and core, surrounded by a protective coating which does not contribute to the optical performance of the optical fiber. By removing the coating at an end portion of the optical fiber, the end portion may be precisely positioned and secured to enable reliable optical communications. A laser beam may be directed at the protective coating to remove the protective coating by one or more ablating, melting, vaporizing, and/or thermal decomposing processes. The optical fiber may also be optionally cleaved. In this manner, the coating may be efficiently removed while retaining at least fifty percent of the tensile strength of the optical fiber.

In one embodiment, a method of laser preparing an end portion of an optical fiber is disclosed. The method comprises emitting a laser beam from a laser. The method further comprises removing at least a portion of a coating from an end portion of an optical fiber by deflecting the laser beam at an angle theta repeatedly across an optical axis of the optical fiber with a control system to form at least two sets of laser scans, and directing the laser beam with the control system to position respective scans of the at least two sets of laser scans to intersect the optical axis of the optical fiber at a plurality of radial positions. The method further comprises cleaving the end portion of the optical fiber by removing at least a portion of the circumference of the optical fiber by deflecting the laser beam at an angle repeatedly across the optical axis of the optical fiber with the control system, and directing the laser beam with the control system to position respective laser cleave scans of the at least two cleave sets of laser cleave scans to intersect the optical axis of the optical fiber at the plurality of radial positions.

In another embodiment, a method of laser preparing an end portion of an optical fiber is disclosed. The method comprises emitting a laser beam from a laser. The method further comprises removing at least a portion of a coating from an end portion of an optical fiber by deflecting the laser beam at an angle theta repeatedly across an optical axis of the optical fiber with a control system to form at least two sets of laser scans, wherein the deflecting with the control system. Removing at least a portion of a coating further comprises directing the laser beam with the control system to position respective scans of the at least two sets of laser scans to intersect the optical axis of the optical fiber at a plurality of radial positions. Removing at least a portion of a coating further comprises changing a spot size of the laser beam to form the at least two sets of laser scans for a subsequent pass of the laser beam.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 3B-1 is a top view of the optical fiber within the laser preparing system of FIG. 3A illustrating an exemplary trajectory of the laser beam as the sets of laser scans are deflected across the optical axis of the optical fiber;

FIGS. 3B-2 to 3B-4 are front axial views of the optical fiber within the laser preparing system of FIG. 3A illustrating the laser beam having a spot size being scanned across the optical axis of the optical fiber from three radial positions, respectively;

DETAILED DESCRIPTION

Figure 1:
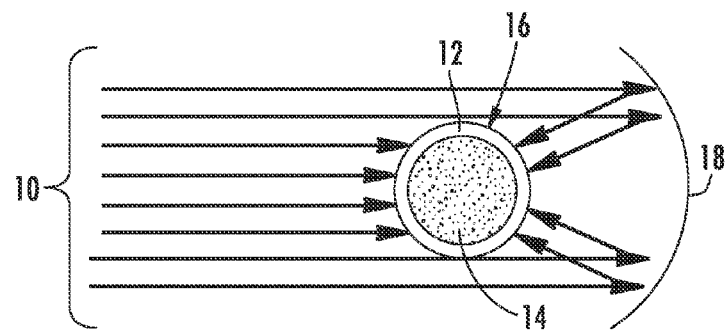
FIG. 1 is an axial view relative to an optical fiber of an exemplary apparatus for window stripping an exterior coating of the optical fiber with a laser beam incident directly on a portion of a circumference of the optical fiber and incident indirectly on a second portion of the circumference after being reflected with a parabolic mirror as is known in the art.

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include coating removal systems for optical fibers. Related methods and optical fibers processed with these methods and coating removal systems are also disclosed. An optical fiber includes a glass fiber, having a cladding and core, surrounded by a protective coating which does not contribute to the optical performance of the optical fiber. By removing the coating at an end portion of the optical fiber, the end portion may be precisely positioned and secured to enable reliable optical communications. A laser beam may be directed at the protective coating to remove the protective coating by one or more ablating, melting, vaporizing, and/or thermal decomposing processes. The optical fiber may also be optionally cleaved. In this manner, the coating may be efficiently removed while retaining at least fifty percent of the tensile strength of the optical fiber.

With regard to laser stripping of polymer coatings, it has been discovered that conventional laser stripping techniques may reduce the tensile strength of the glass portion of the optical fiber. For example, the glass portion of an optical fiber may lose more than fifty (50) percent of its tensile strength following removal of the polymer coating with a continuous-wave or pulsed laser operating at a wavelength of 10.6 microns. Applicants believe that absorption of laser power by the glass during such conventional laser stripping techniques damages and correspondingly weakens the glass portion of the optical fiber. By applying tension to the optical fiber during the laser stripping in combination with scanning the laser beam across an optical axis of the optical fiber from different radial directions equally distributed about the circumference of the optical fiber to remove the coating, it has been found that the tensile strength of the optical fiber may be largely retained after the polymer coating has been removed. Moreover, it has been discovered that irradiating the optical fiber with laser scans which are incident on the optical fiber from various radial positions may create a uniform or substantially uniform energy intensity around the circumference of the optical fiber. The uniform or substantially uniform energy intensity minimizes the thermal stresses caused by an otherwise non-uniform heat absorption around a circumference of the optical fiber and may also help to better retain tensile strength of the optical fiber. With this approach, a user may control spot size of the laser beam and laser power to obtain an energy density to have the coating of the optical fiber absorb most of the laser energy and thereby be removed while minimizing the laser energy absorbed by the silica (glass). In this manner, a high tensile strength of laser stripped fiber is achievable. Moreover, by applying tension to the optical fiber during the coating removal process, it has been found that the average tensile strength of the optical fiber may be improved further while reducing tensile strength variation.

Figure 2A:
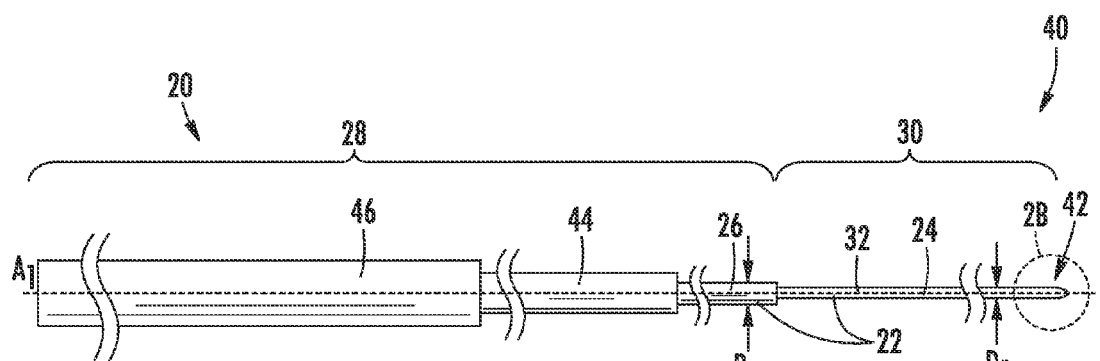
FIG. 2A is a side view of an exemplary fiber optic cable comprising an optical fiber cleaved to create a bulletnose shape at an end portion of the optical fiber and a coating layer stripped from the end portion of the optical fiber utilizing a laser preparing system as disclosed herein for stripping and cleaving.
Figure 2B:
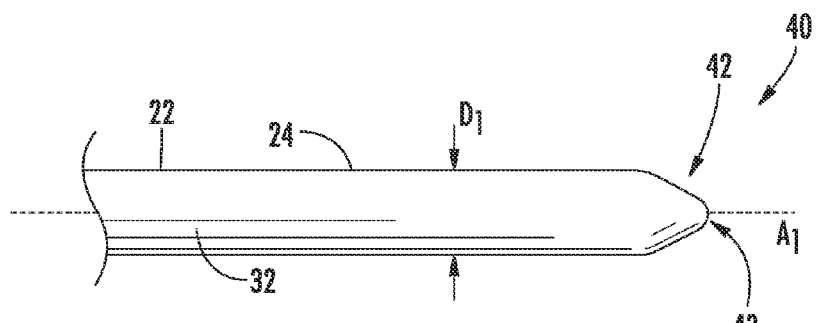
FIG. 2B is a close-up side view of an end portion of the optical fiber of FIG. 2A illustrating the bulletnose shape.

An optical fiber stripped and cleaved by a laser system will first be discussed before summarizing various approaches to strip and cleave the optical fiber. Then, a laser preparing system to implement these various approaches will be discussed in detail before discussing alternative embodiments. Consistent with this plan, FIGS. 2A and 2B are a side view and a close-up side view illustrating an exemplary fiber optic cable 20 which includes an optical fiber 22. According to an exemplary embodiment, the optical fiber 22 is a glass optical fiber configured for high-speed data communication via the transmission of electromagnetic radiation (e.g., light). In some such embodiments, the optical fiber 22 is a germanium-doped silica glass fiber having a glass portion 24 that includes a glass core and glass cladding. The optical fiber 22 may be a single-mode or multi-mode fiber, and may be a standard fiber or bend-insensitive fiber (e.g., CLEARCURVE® fiber or another optical fiber commercially available from CORNING INCORPORATED of Corning, N.Y.).

According to an exemplary embodiment, the optical fiber 22 includes a coating 26 exterior to the glass portion 24. In some embodiments, the coating 26 is formed from a polymer, such as an acrylic, UV-cured urethane acrylate composite, dual-layer polymer coatings, or other coatings. The coating 26 may be mechanically coupled (e.g., adhered) to the glass portion 24 and thereby may be in direct contact with the cladding of the optical fiber 22. According to an exemplary embodiment, the glass portion 24 alone has a diameter $D_1$ of about 125 microns; and with the coating 26, the optical fiber 22 has a diameter $D_2$ of about 250 microns. The coating 26 may be disposed along a first lengthwise portion 28 and may include or be further covered by a dye that corresponds to a color code of the optical fiber 22. The fiber optical fiber 22 of the fiber optic cable 20 may include a second lengthwise portion 30 where the coating 26 is not present on at least ninety (90) percent of an exterior surface 32 of the glass portion 24. An end portion 40 of the optical fiber 22 may include a bulletnose shape 42. The bulletnose shape 42 may comprise cross sections orthogonal to the optical axis $A_1$ which are concentric or substantially concentric about the optical axis $A_1$ and tapered along the optical axis $A_1$ to an end point 43. In this manner, the second lengthwise portion 30 may be available to be easily inserted through a ferrule bore 34 of a ferrule 36 and precisely located relative to the ferrule 36 to establish an optical connection as will be discussed near the end of this disclosure relative to FIG. 12. It is noted that the bulletnose shape 42 may be processed to final shape, for example, a planar shape before an optical connection may be established.

With continued reference to FIGS. 2A and 2B and according to an exemplary embodiment, the optical fiber 22 is further surrounded by a buffer 44, such as a buffer tube (e.g., polyethylene, polyurethane). The optical fiber 22 may be tight-buffered, with the buffer 44 directly attached to the optical fiber 22. In other embodiments, the optical fiber 22 is loose-tube buffered, where one or more of such optical fibers 22 loosely extend through the buffer 44 and may be accompanied within the buffer 44 by strength members, water-blocking grease, water-blocking yarns, water-absorbing powder, and/or other components.

According to an exemplary embodiment, the optical fiber 22 and the buffer 44 are surrounded by a jacket 46 of the fiber optic cable 20. The jacket 46 may include a polymer material (e.g., polyethylene) and may be extruded around the buffer 44 and the optical fiber 22, providing a barrier to an interior of the jacket 46. In some embodiments, strength members are embedded in or are surrounded by the jacket 46 to provide tensile strength to the fiber optic cable 20, and/or for other reasons such as to provide a bending-direction preference for the fiber optic cable 20. The jacket 46 may be round, oblong, or otherwise shaped in cross-section and may contain one or more of the optical fibers 22 and one or more of the buffers 44, such as six buffer tubes each containing twelve optical fibers, where the buffer tubes are stranded around a central strength member of steel wire or glass-reinforced plastic. In other embodiments, the optical fiber 22 may not be surrounded by the buffer 44 and/or the jacket 46.

Figure 3A:
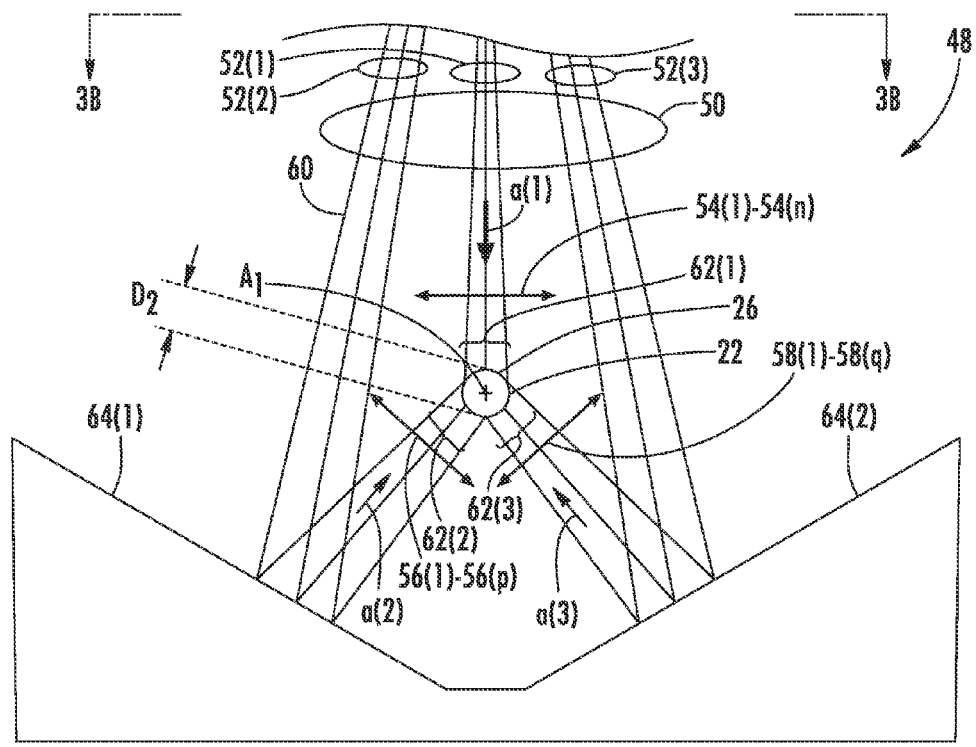
FIG. 3A is a front axial view of the optical fiber within a laser preparing system illustrating exemplary pathways of at least two sets of laser scans formed by a laser beam as the sets of laser scans are deflected across an optical axis of the optical fiber and directed to be at different radial positions to remove a coating of the optical fiber.
Figures 1, 3B:
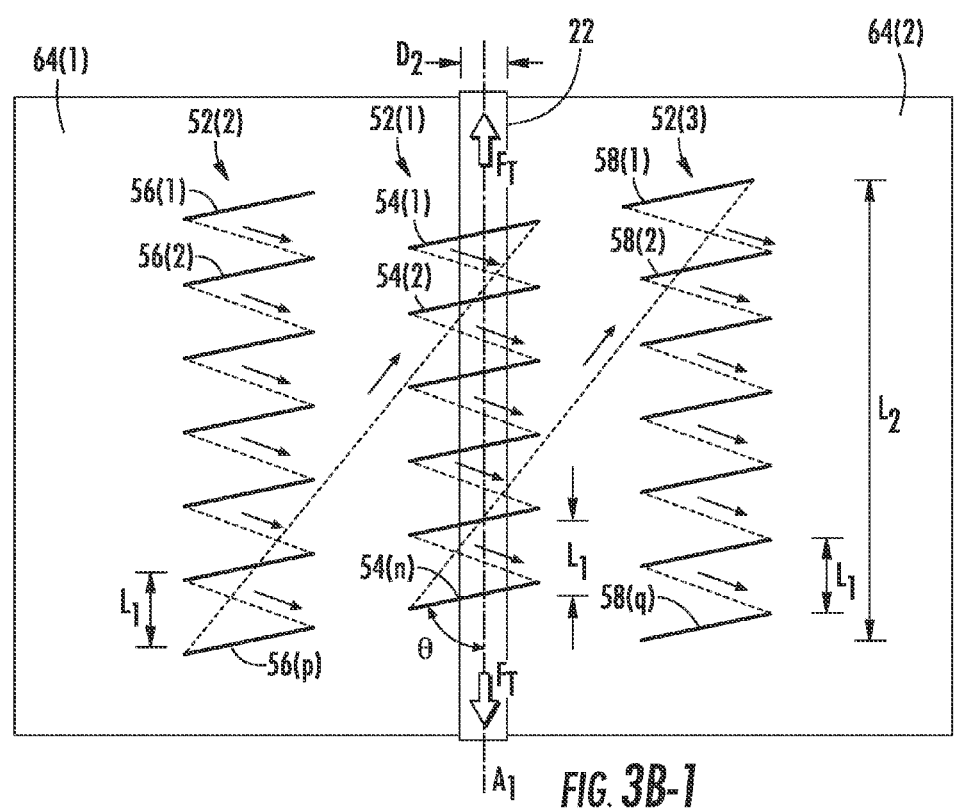
Figures 2, 3B:
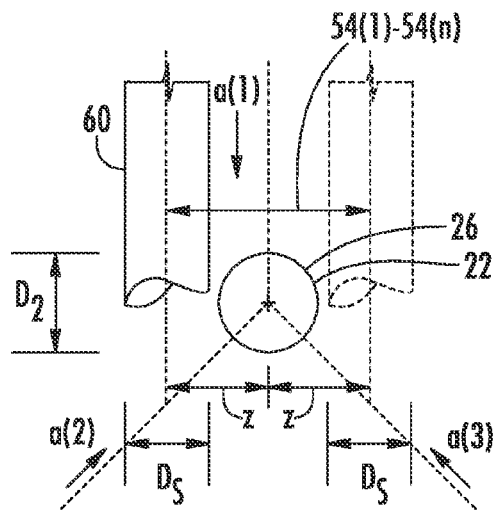
Figures 3, 3B:
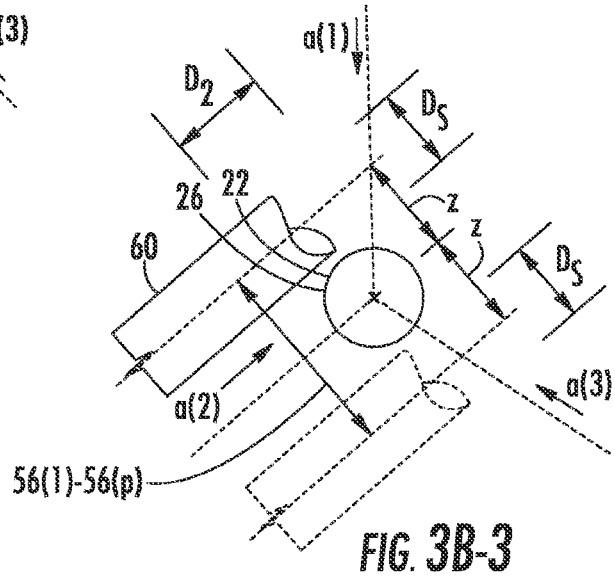

To remove the coating 26 at the end portion 40 of the optical fiber 22, the coating 26 within the second lengthwise portion 30 is removed by being ablated, melted, vaporized, and/or thermally decomposed with a uniform or substantially uniform laser energy intensity along the circumference of the optical fiber 22 as one approach to retain tensile strength of the optical fiber 22. FIGS. 3A and 3B-1 are a front axial view and a top view, respectively, of the optical fiber 22 within a laser preparing system 48 illustrating exemplary pathways 50 of at least two sets 52(1)-52(3) of laser scans 54(1)-54($n$), 56(1)-56($p$), 58(1)-58($q$) formed by a laser beam 60 as the three sets 52(1)-52(3) of laser scans 54(1)-58($q$) are deflected across the diameter $D_2$, or more generically "the width," of the optical fiber 22 from a plurality of radial positions a(1)-a(3) to remove the coating 26 of the optical fiber 22. The radial positions a(1)-a(3) are equally distributed or substantially equally distributed about the circumference of the optical fiber 22. As used herein, substantially equally distributed means each of the radial positions a(1)-a(3) is within fifteen (15) degrees of being equally distributed. It is noted that two or more radial positions are possible, and in the embodiment that is depicted in FIG. 3A, the radial positions a(1)-a(3) may be a quantity of three (3) and separated by one-hundred twenty (120) degrees, plus or minus fifteen (15) degrees, to be equally distributed or substantially equally distributed about the circumference of the optical fiber 22. In this manner, a uniform or substantially uniform cumulative energy intensity may be cumulatively contributed by the sets 52(1)-52(3) around the circumference of the optical fiber 22 to efficiently remove the coating 26 across the second lengthwise portion 30.

Specifically, the set 52(1) of the at least two sets 52(1)-52(3) are directed to the optical fiber 22 where the set 52(1) intersects the optical axis $A_1$ of the optical fiber 22 at a first radial position a(1). The set 52(1) is deflected across the optical axis $A_1$ of the optical fiber 22 in one or more of the laser scans 54(1)-54($n$) to remove a portion 62(1) of a layer of coating 26 from a circumference of the optical fiber 22.

Moreover, the sets 52(2), 52(3) of the at least two sets 52(1)-52(3) are directed to at least one reflector 64(1), 64(2) to be reflected to the optical fiber 22 where the sets 52(2), 52(3) intersect the optical axis $A_1$ of the optical fiber 22 at corresponding remaining radial positions a(2), a(3), respectively. The sets 52(2), 52(3) are deflected across the optical axis $A_1$ of the optical fiber 22 in one or more of the laser scans 56(1)-56($p$), 58(1)-58($q$) to remove portions 62(2), 62(3) of the coating 26 from the circumference of the optical fiber 22. In this manner, the uniform or substantially uniform cumulative energy distribution may be provided around the circumference of the optical fiber 22.

There are many ways to optimize the placement of the laser scans 54(1)-58($q$). The laser scans 54(1)-58($q$) may be angled at an angle θ (theta) between forty-five (45) to ninety (90) degrees relative to the optical axis $A_1$. The angle θ (theta) is oriented preferably at ninety (90) degrees to provide a more uniform transition between the first lengthwise portion 28 and the second lengthwise portion 30 (FIG. 2A), but a smaller value of the angle θ may be used to maximize the dwell time of each of the laser scans 54(1)-58($q$) upon the optical fiber 22 to quicken coating removal. Adjacent laser scans within either the set 52(1), set 52(2), or set 52(3) may be separated by a pitch distance $L_1$ along the optical axis $A_1$. In this manner, the coating 26 may be gradually removed from the optical fiber 22 along a direction of the optical axis $A_1$ until the length $L_2$ of the second lengthwise portion 30 is complete. The pitch distance $L_1$ may be, for example, between twenty-five (25) microns and one-hundred fifty (150) microns, and preferably fifty (50) microns. However, the pitch distance $L_1$ may vary depending upon a laser spot size $D_S$ (FIGS. 3B-2 to 3B-4), power, power density, power distribution, wavelength, and other factors. It is noted that the sets 52(1)-52(3) may be completed in sequence or portions of the sets 52(1)-52(3) may completed sequentially so that the sets 52(1)-52(3) are completed at approximately the same time. Further, the length $L_2$ may be, for example, one-hundred twenty (120) millimeters. The length $L_2$ may be made longer or shorter than one-hundred twenty (120) millimeters, according to the requirements of the optical fiber 22 for an intended application.

FIGS. 3B-2 to 3B-4 are front axial views of the optical fiber 22 within the laser preparing system 48 of FIG. 3A illustrating the laser beam 60 having the spot size $D_S$ being scanned across the optical axis $A_1$ of the optical fiber 22 from the radial positions a(1)-a(3), respectively. A portion 2*z of each of the laser scans 54(1)-54($n$), 56(1)-56($p$), 58(1)-58($q$) may be at least as wide as a diameter $D_2$ of the optical fiber 22, so that a center line $C_L$ of the laser beam 60 travels across the diameter $D_2$ or width of the optical fiber 22. In this manner, a uniform intensity of the laser beam 60 may be incident upon the optical fiber 22 from each of the radial positions a(1)-a(3). It is noted that the incident energy from the laser beam 60 includes laser energy that is absorbed by, reflected by, or transmitted through the optical fiber 22.

Figures 3, 3B, 4:
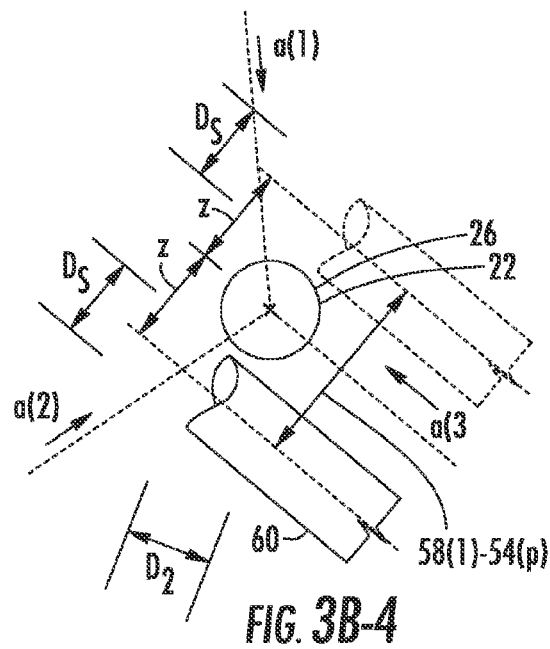
Figure 3C:
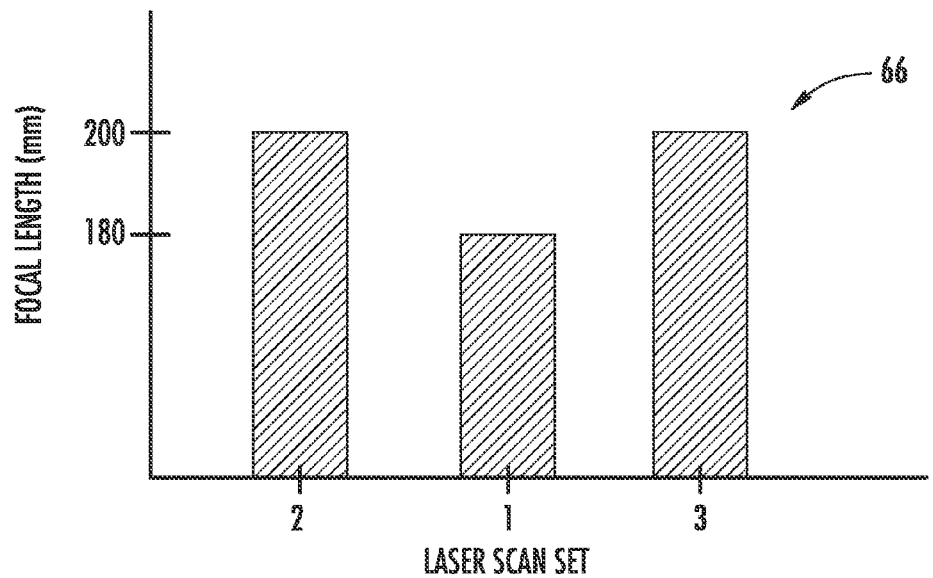
FIG. 3C is a chart of effective focal length of the laser beam for each of the sets of the laser scans of FIG. 3B-1.
Figure 3D:
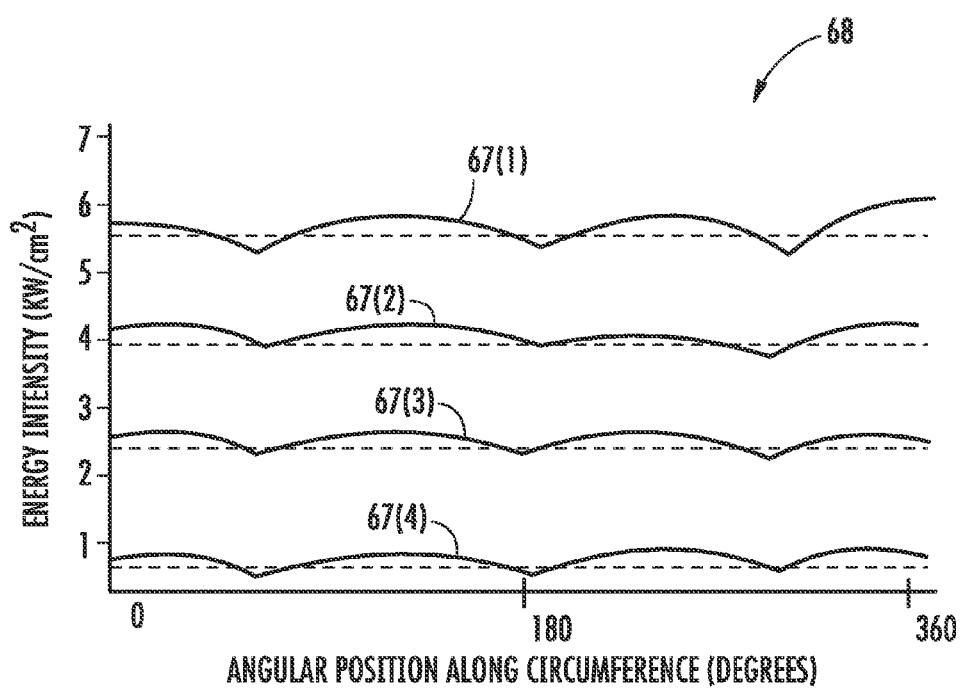
FIG. 3D is a chart of energy intensity of the laser beam for the three sets of laser scans of FIG. 3B-1 for four (4) passes incident along a circumference of the optical fiber illustrating a changing energy intensity per pass and a uniform or substantially uniform energy intensity along the circumference of the optical fiber for each of the passes.
Figure 4A:
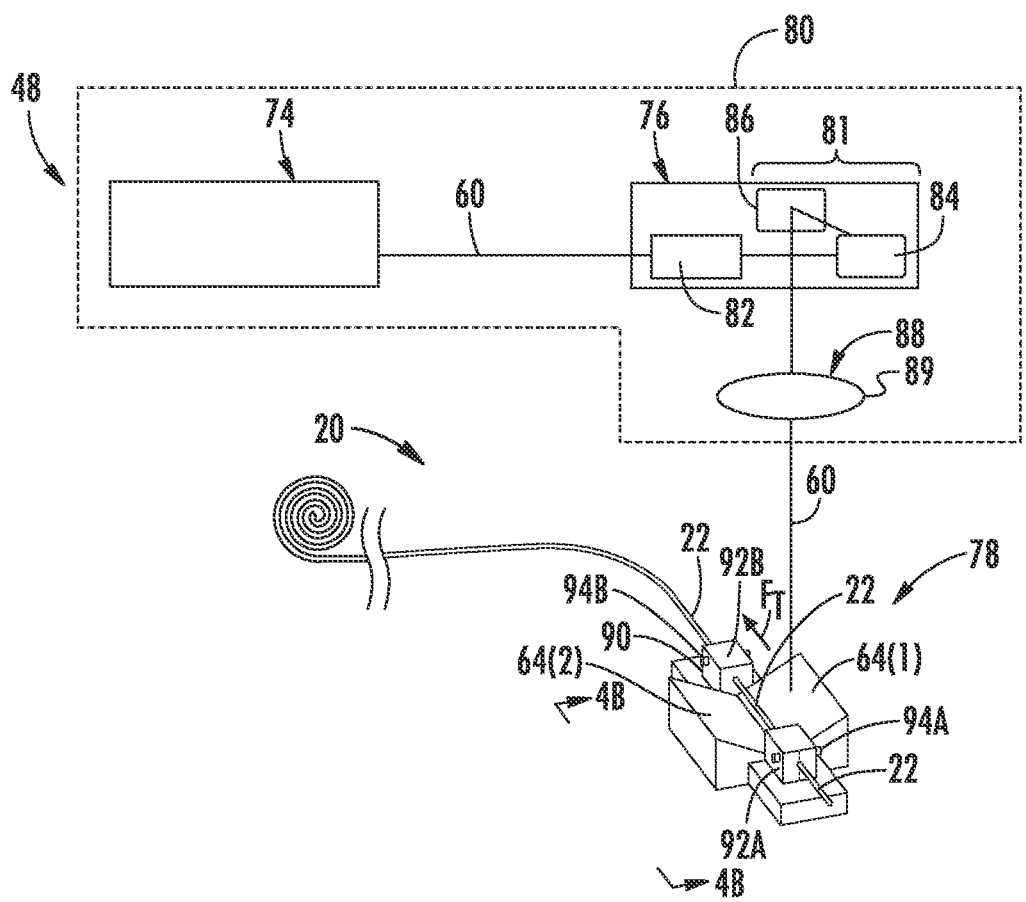
FIG. 4A is a schematic diagram of a laser preparing system for preparing the end portion of the optical fiber by deflecting the sets of laser scans of FIGS. 3A and 3B-1 across the optical axis of the optical fiber from the radial positions.
Figure 4B:
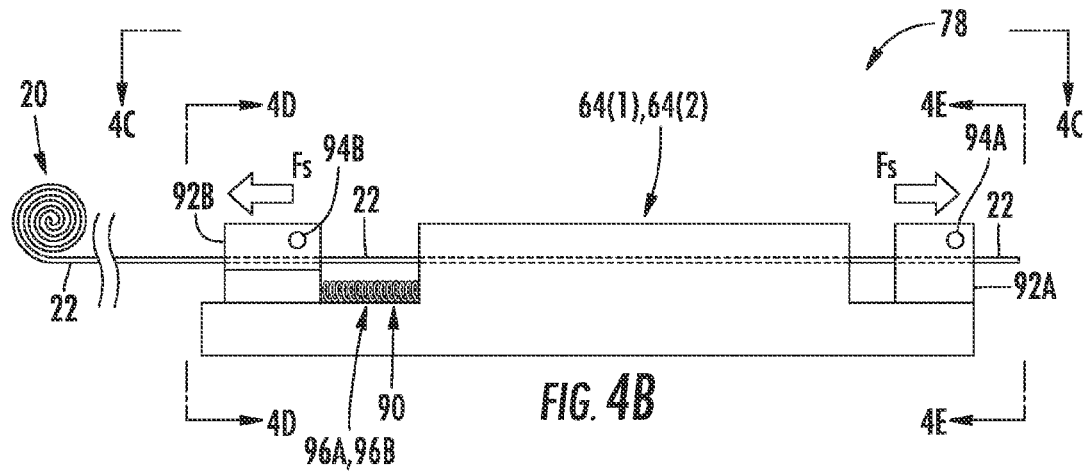
FIGS. 4B-4F are a left side view, top view, front view, rear view, and top perspective view of a multi-function fixture of the laser preparing system of FIG. 4A.
Figure 4C:
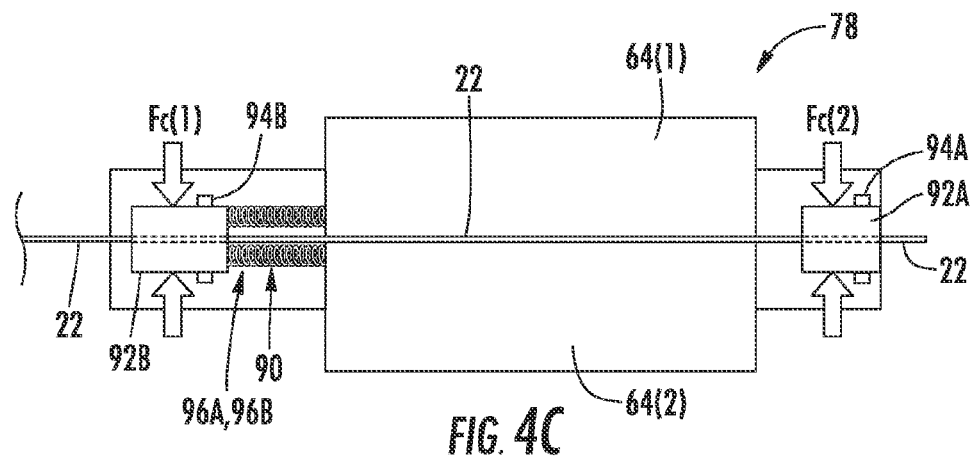
Figure 4D:
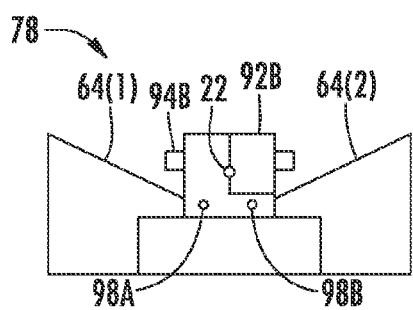
Figure 4E:
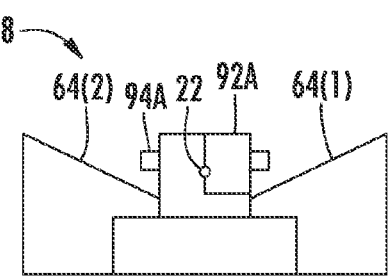
Figure 4F:
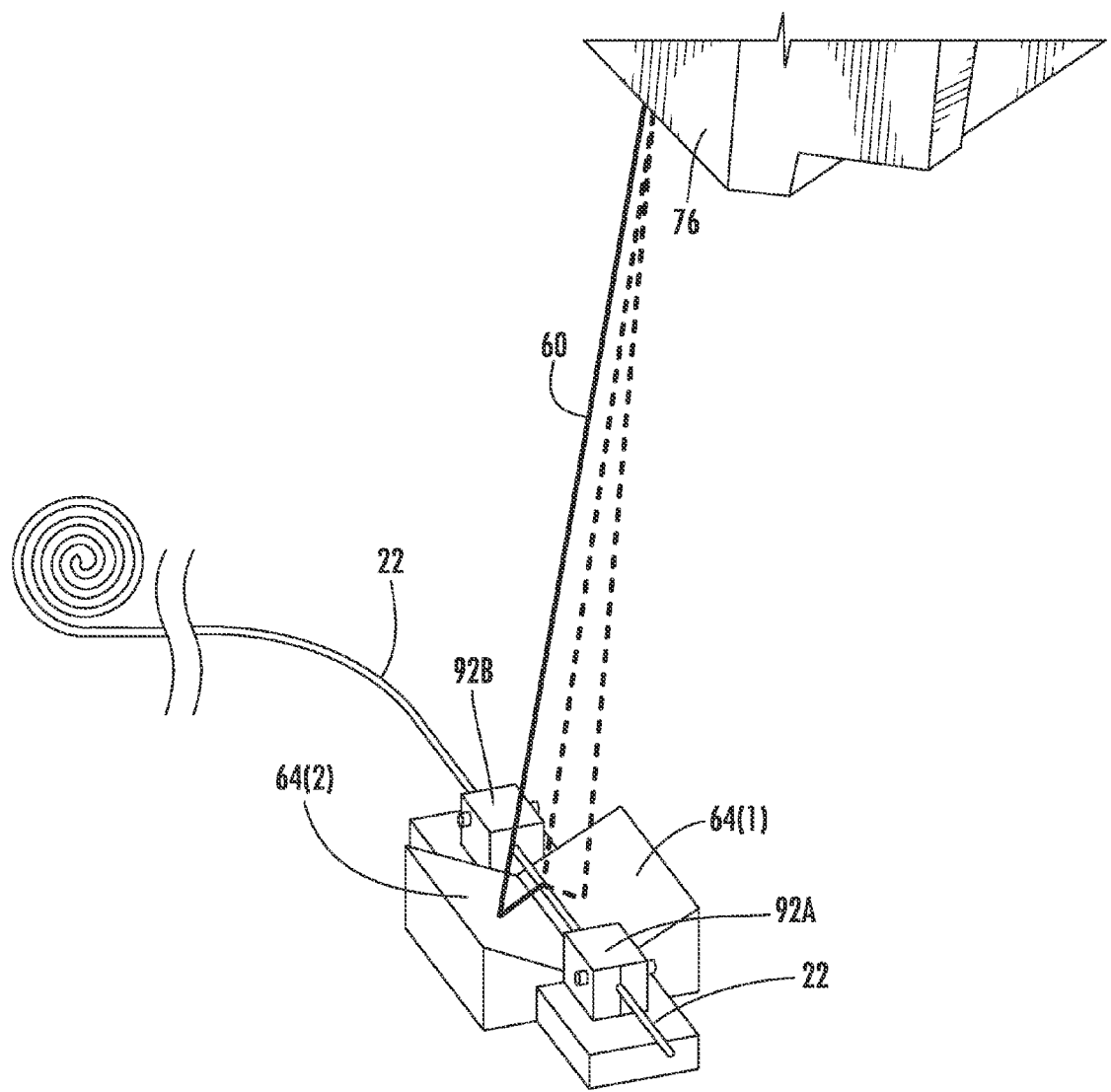

FIG. 3C is a chart 66 of effective focal length of the laser beam 60 for each of the at least three sets 52(1)-52(3) of the laser scans 54(1)-58($q$) of FIG. 4B. The effective focal length determines the spot size $D_S$ which may be changed for the laser beam 60 for each of the sets 52(1)-52(3) to vary energy intensity which is inversely proportional to a square of a diameter of the spot size $D_S$ of the laser beam 60 incident upon the optical fiber 22. Both the spot size $D_S$ and laser power may be adjusted to provide the energy intensity to remove the coating 26 and minimize laser energy absorbed by the glass portion 24 (FIG. 2A). In one example, the set 52(1) may utilize a one-hundred eighty (180) millimeter effective focal length and the sets 52(2), 52(3) may use a two-hundred (200) millimeter effective focal length. Specifically, the effective focal length of the laser beam 60 for the set 52(1) may be preferably shorter than the effective focal length for the sets 52(2)-52(3) to compensate for the optical fiber 22 being closer to the source of the laser beam 60. The same effective spot size $D_S$ may thereby be obtained from the sets 52(1)-52(3) to be incident on the optical fiber 22 from the radial positions a(1)-a(3). A substantially uniform or uniform energy intensity distribution 67(1) may thereby be obtained along the circumference from zero (0) to 360 degrees as shown in a chart 68 of FIG. 3D where as discussed herein the energy distribution may vary less than twenty (20) percent over the circumference of the optical fiber 22 from a maximum energy intensity.

The sets 52(1)-52(3) of the laser scans 54(1)-58($q$) may be formed merely once in a single "pass" of the laser beam 60 or may be formed again in one or more "subsequent pass" when the laser beam 60 may retrace the laser scans 54(1)-58($q$) upon the optical fiber 22. In one embodiment, the average incident energy intensity over the circumference begins at 5.5 kilowatts per square centimeter for the energy intensity distribution 67(1) during a first pass, decreases to 3.9 kilowatts per square centimeter for the energy intensity distribution 67(2) during a second pass, decreases to 2.2 kilowatts per square centimeter for the energy intensity distribution 67(3) during a third pass, and decreases to 0.6 kilowatts per square centimeter for the energy intensity distribution 67(4) during a fourth pass. In this manner, the coating 26 may be removed more efficiently by avoiding the formation of residue portions of coating 26 which may require the optical fiber 22 to be exposed to more energy to completely remove the coating 26.

It is noted that in the embodiment shown in FIG. 3D that successive passes 67(2)-67(4) of the passes 67(1)-67(3), respectively, have lower energy intensities. In other embodiments, one or more of the passes 67(1)-67(4) may be utilized, or more than four (4) passes 67(1)-67($z$) may be utilized to remove the coating 26. In addition, any subsequent passes may deliver higher, lower, or similar levels of incident energy intensity to the optical fiber 22 as a previous pass.

Adjustment of the spot size $D_S$ of the laser beam 60 incident upon the optical fiber 22 is a factor to ensure uniform or substantially uniform energy intensity around the circumference of the optical fiber 22. In one embodiment, the laser beam 60 has a Gaussian intensity distribution and is swept at a constant speed across the optical fiber 22. In that embodiment, the energy incident upon the optical fiber 22 will be maximum as the laser beam 60 is centered upon the optical fiber 22. The energy incident upon the optical fiber 22 decreases and thereby varies as the laser beam 60 is increasingly positioned away from center of the optical fiber 22. The spot size $D_S$ relative to the diameter of the optical fiber 22 determines the percentage decrease of energy incident along the circumference of the optical fiber 22. For example, for values of the spot size $D_S$ less than twice the diameter of the optical fiber 22, the incident energy decreases to about fifty (50) percent. With values of the spot size $D_S$ of at least twice the diameter $D_2$ of the optical fiber 22, then the incident energy may similarly decrease less than forty (40) percent. When the spot size $D_S$ is at least 2.7 times the diameter of the optical fiber 22, then the energy intensity distribution may vary less than twenty (20) percent over the circumference of the optical fiber 22. Accordingly, for an optical fiber 22 having a diameter of two-hundred fifty (250) microns, then the spot size $D_S$ of at least six-hundred seventy-five (675) microns may provide an energy intensity distribution which may vary less than twenty (20) percent over the circumference of the optical fiber 22. As long as coating removal and retained tensile strength requirements are met, spot sizes $D_S$ less than 2.7 times the diameter of the optical fiber 22 may be utilized for removing the coating 26.

It is noted that "spot size $D_S$" of the laser beam 60 incident upon the optical fiber 22 as used herein depends on whether the laser beam 60 has a Gaussian intensity distribution. For laser beams 60 having a non-Gaussian intensity distribution, the spot size $D_S$ is based on the full-width at half-maximum (FWHM) measurement technique wherein a width (or diameter) of the laser beam 60 is calculated based on a perimeter (or circumference) of the laser beam 60 where the intensity is fifty (50) percent of a maximum intensity. For laser beams 60 having a Gaussian intensity distribution, the spot size $D_S$ is based on the $1/e^2$ measurement technique wherein a circumference of the laser beam 60 is measured where an energy intensity is 13.5 percent (based on $1/e^2$, wherein e=2.7183) of a maximum intensity of the laser beam 60.

In cases when the coating 26 may not be fully removed from the second lengthwise portion 30 of the optical fiber 22 after the sets 52(1)-52(3) are completed, then the sets 52(1)-52(3) may be re-deflected upon the optical fiber 22 in subsequent "passes." The spot size $D_S$ of the laser beam 60 may be increased to lower the energy intensity incident upon the optical fiber 22 to reduce the amount of coating 26 remaining in the second lengthwise portion 30 while reducing the energy available to damage the optical fiber 22 and thereby lower tensile strength.

Figure 3E:
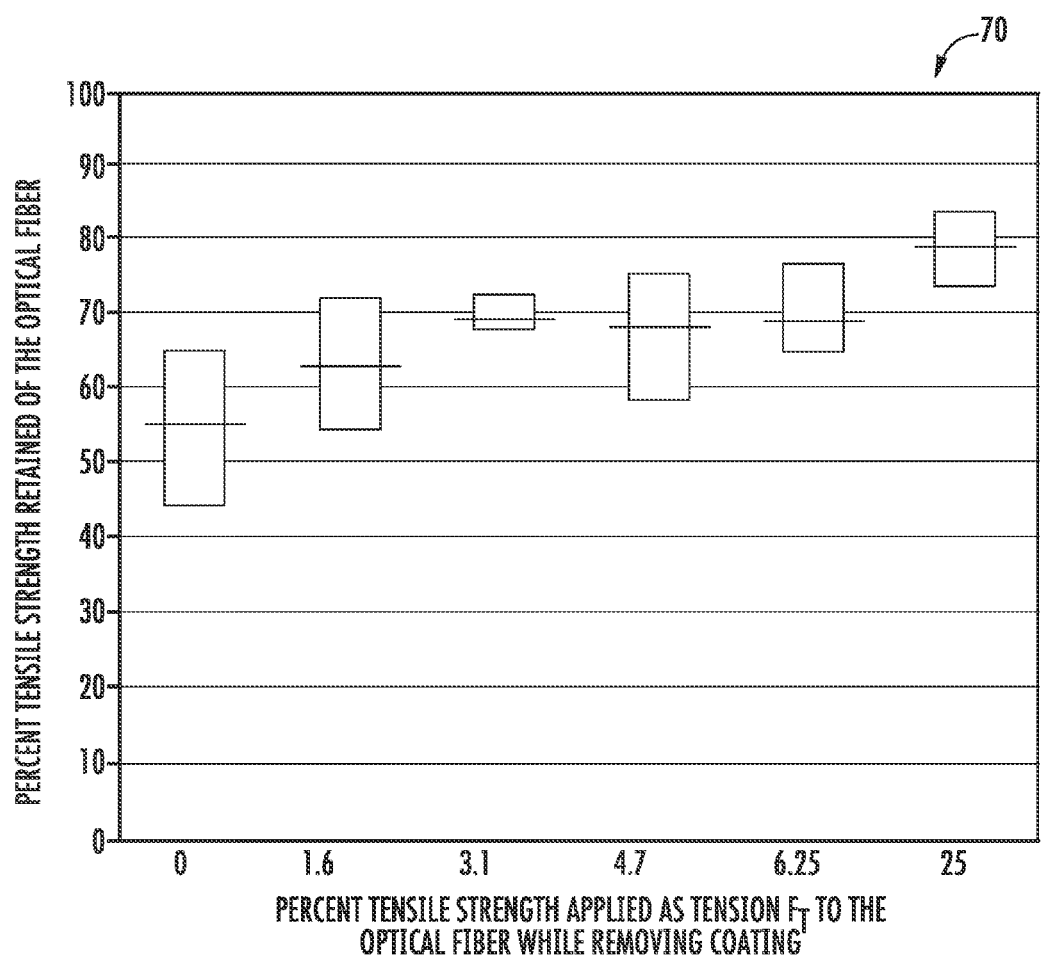
FIG. 3E is a chart of percent tensile strength retained of the optical fiber versus tension applied to the optical fiber as a percent of tensile strength during the coating removal, illustrating that applying a tension during coating removal tends to increase retained average tensile strength.

One additional way of improving the tensile strength of the optical fiber 22 at the second lengthwise portion 30 is to apply a tension $F_T$ (FIG. 3B-1) to the optical fiber 22 while the coating 26 is being removed. FIG. 3E is a chart 70 of percent of tensile strength retained of the optical fiber 22 versus percent tensile strength applied to the optical fiber 22 during the removal of the coating 26. The data in FIG. 3E was provided for a plurality of optical fibers 22 having an eight-hundred forty-one (841) kpsi median tensile strength and a two-hundred fifty (250) micron diameter, including a 62.5 micron thickness of the coating 26. The chart 70 of FIG. 3E includes boxes intersected by horizontal lines. Each box defines a interquartile range of tensile strength which is a measure of statistical dispersion. The respective strongest tensile strength measurements observed which are part of the top quartile (25 percent) of the statistical dispersion occur above each of the boxes. The respective weakest tensile strength measurements observed which are part of the bottom quartile (25 percent) of the statistical dispersion occur below each of the boxes. The boxes contain the "middle fifty percent" of tensile strength measurements and the horizontal lines define the average tensile strength measurement observed. For example, when no tension $F_T$ was applied to the optical fiber 22 during removal of the coating 26, on average at least fifty-five (55) percent of their tensile strength was retained. When 6.25 percent of the tensile strength was applied as the tension $F_T$, the optical fibers tested under this other tensile condition retained on average at least sixty-eight (68) percent of their tensile strength showing improvement over the no tension situation.

The reasons for the improvement in the retained tensile strength are complex. The laser irradiation incident upon the optical fiber 22 introduces rapid heating and cooling cycles into the optical fiber 22, and the resulting large transient temperature changes of the optical fiber 22 due to the fast heating and cooling cycles generate stress waves which propagate through the optical fiber 22. By placing the optical fiber 22 under tension $F_T$ during the coating 26 removal, it is believed that thermal stresses caused by large transient temperature changes of the optical fiber 22 are more efficiently relieved and thereby at least some of the damage to tensile strength of the optical fiber 22 is avoided. The chart 70 in FIG. 3E depicts adding values of tension $F_T$ up to twenty-five (25) percent of the tensile strength can bring the average retained tensile strength to at least seventy-eight (78) percent. It is believed that an optimal value of the tension $F_T$ applied to the optical fiber 22 during coating removal may vary according to a type of the optical fiber 22 being stripped, but may be less than fifty (50) percent of the tensile strength to avoid damage. Consistent with this upper limit, the tension $F_T$ may be applied to the optical fiber 22 during coating 26 removal in a range between one (1) percent and fifty (50) percent of the tensile strength of the optical fiber 22. In this manner, at least fifty (50) percent of the tensile strength may be retained of the optical fiber 22 after the coating 26 removal as evidenced by tensile strength data from at least seventy-five (75) percent of optical fibers 22 with tension $F_T$ applied during coating removal as shown in FIG. 3E.

Summaries of various approaches to strip coating from the optical fiber have been introduced. Now the specifics of the laser preparing system 48 to implement these various approaches will be discussed in detail before discussing alternative embodiments. In this regard, FIG. 4A is a schematic diagram of an exemplary laser preparing system 48 for preparing the end portion 40 of an optical fiber 22. The laser preparing system 48 may remove the coating 26 and cleave the optical fiber 22 while maintaining tensile strength of the optical fiber 22. The laser preparing system 48 comprises a laser 74, control system 76, and multi-function fixture 78. Details of each will be discussed in turn.

The laser 74 emits the laser beam 60 at a wavelength λ to remove the coating 26 and may also be used to cleave the optical fiber 22. The wavelength λ may be in a range from one-hundred fifty-seven (157) nanometers to 10.6 microns, and preferably at a wavelength λ of 9.3 microns. The laser 74 may be, for example, a carbon dioxide laser 74z emitting the laser beam 60 with a wavelength λ of 9.3 microns. In one embodiment, the laser 74 may be a Diamond™ C-20A laser manufactured by Coherent Incorporated of Santa Clara, Calif. In the preferred embodiment, the laser may be the carbon dioxide laser 74z with at least ten (10) watts emitting, for example, laser power at pulsed durations of at least forty (40) microseconds.

The control system 76 directs the laser beam 60 directly to the optical fiber 22 or indirectly to the optical fiber 22 after being reflected by the at least one reflector 64(1), 64(2). The control system 76 also deflects the laser beam 60 across the optical axis $A_1$ of the optical fiber 22 with the sets 52(1)-52(3) of the laser scans 54(1)-58(q) (FIG. 3B-1). The control system 76 may direct and deflect the laser beam 60 in X, Y, and Z directions for precise control of the placement and spot size $D_S$ of the laser beam 60.

The control system 76 in combination with the laser 74 together may comprise an integrated laser and scan head 80. In one embodiment, the scan head 80 may comprise a ML-Z9500 Series Laser Marker manufactured by Keyence America of Elmwood Park, N.J.

The scan head 80 may include many features to move the laser beam 60 while maintaining the laser 74 stationary to the optical fiber 22. The scan head 80 may comprise a z-scanner 82 having one or more optical lenses in combination with an optical translating device to change the effective focal length and thereby the spot size $D_S$ of the laser beam 60 upon the optical fiber 22. The scan head 80 may also include a Galvanometer scanner 81 comprising an x-scanner 84 and a y-scanner 86 to direct and deflect the laser beam 60. The x-scanner 84 and a y-scanner 86 may comprise, for example, at least one mirror which may scan the laser beam 60 at considerable maximum speeds which, in one embodiment, may be twelve (12) meters per second. In this manner, the laser beam 60 may be simultaneously controlled in the X, Y, and Z directions. Alternatively, physically moving the laser 74 and/or optical fiber 22 to obtain an equivalent relative scan movement of the laser beam 60 across the optical fiber 22 at the same speeds may be possible but inefficient and impractical.

Moreover, the control system 76 may also include a scanning lens 88 to provide a flat image field at the optical fiber 22 so that the effective focal length of the laser beam 60 may remain constant over the length $L_2$ of the second lengthwise portion 30. In one embodiment, the scanning lens 88 may comprise a F-theta lens 89; however, alternatively the scanning lens 88 may comprise, for example, a flat-field lens or a telecentric f-theta lens. In this manner, the laser 74 and the optical fiber 22 may remain stationary as the control system 76 directs and deflects the laser beam 60 to remove the coating 26 from the optical fiber 22 and/or cleaves the optical fiber 22.

With continued reference to FIG. 4A and reference back to FIGS. 3A and 3B-1, the multi-function fixture 78 of the laser preparing system 48 includes the at least one reflector 64(1), 64(2) to reflect the sets 52(2), 52(3) of the laser scans 56(1)-58(q) of the laser beam 60. The sets 52(2), 52(3) intersect the optical axis $A_1$ of the optical fiber 22 at corresponding the radial positions a(2), a(3). In this manner, a uniform or substantially uniform energy intensity may be achieved across the optical fiber 22 to uniformly and efficiently remove the coating 26 and thereby minimize opportunity to damage the optical fiber 22.

The multi-function fixture 78 also includes a tension generator 90 which applies the tension $F_T$ to the optical fiber 22 during the removal of the coating 26 and also may apply the tension $F_T$ during optional cleaving with the laser beam 60. FIGS. 4B-4F are a left side view, top view, front view, rear view, and top perspective view of the multi-function fixture 78 of the laser preparing system 48 illustrating the tension generator 90. The multi-function fixture 78 includes a stationary fiber holder 92A which holds the optical fiber 22 at one side of the reflectors 64(1), 64(2) and a movable fiber holder 92B at the opposite side of the reflectors 64(1), 64(2). The optical fiber 22 is removably secured to the stationary fiber holder 92A and to the moveable fiber holder 92B by securing devices 94A, 94B, respectively, for example clamps applying clamping forces $F_C(1)$, $F_C(2)$ upon the optical fiber 22. The at least one moveable fiber holder 92B may translate along a mechanical component, for example, at least one guiding rod 98A, 98B in a direction of the optical axis $A_1$ of the optical fiber 22. Accordingly, when the tension generator 90 comprising, for example at least one spring 96A, 96B is adjusted to place a force $F_T$ upon the movable fiber holder 92B, then the tension $F_T$ is applied via the movable fiber holder 92B to the optical fiber 22. It is noted that the at least one spring 96A, 96B may be disposed between the moveable fiber holder 92B and the reflectors 64(1), 64(2).

Figure 5:
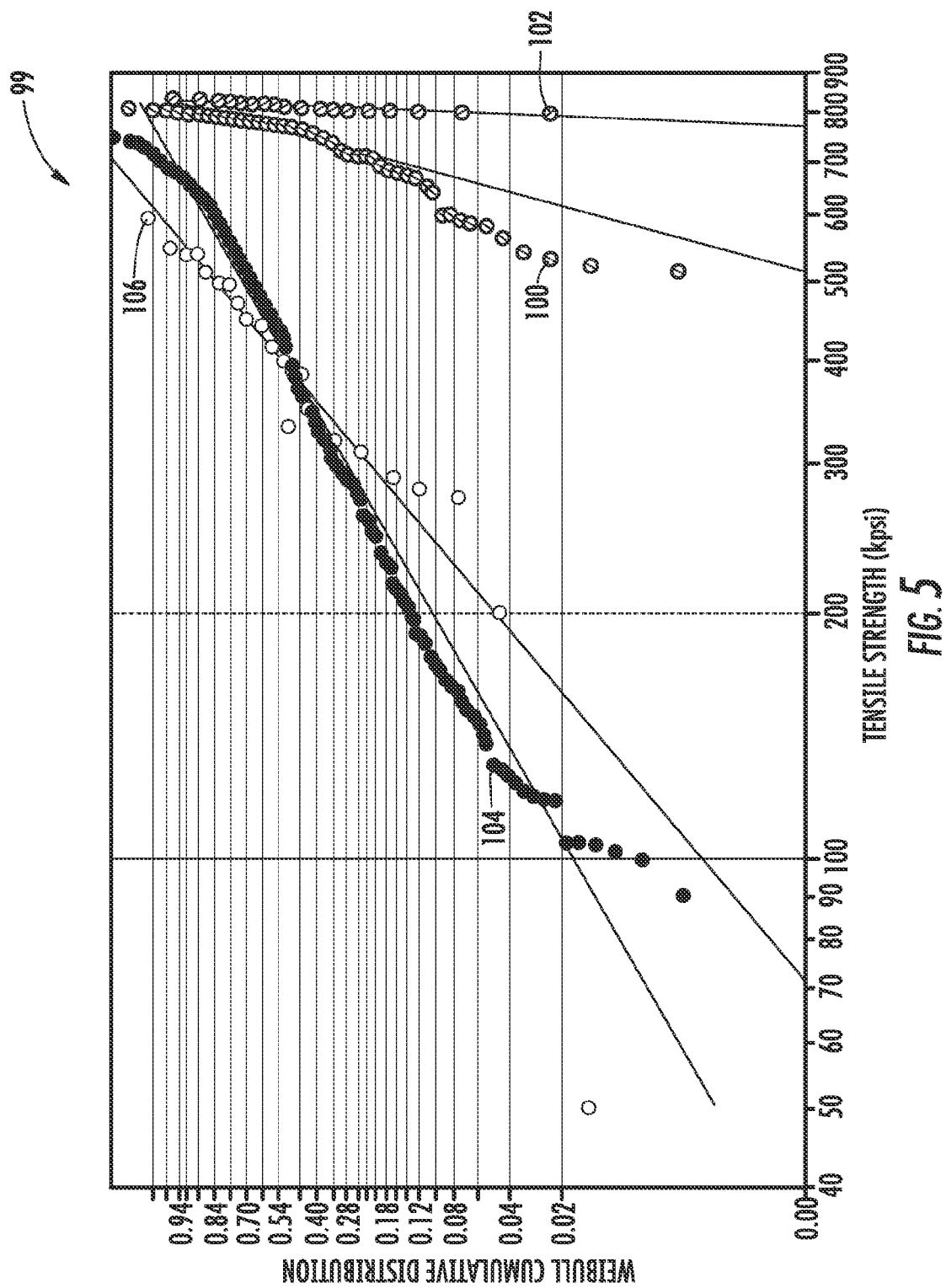
FIG. 5 is a Weibull plot of tensile strength data of optical fibers with their coatings removed with the laser preparing system of FIG. 4A while under tension to illustrate the tensile strength advantage over tensile strength data from optical fibers removed of their coatings using conventional hot gas and mechanical stripping processes.

FIG. 5 is a Weibull cumulative distribution function plot 99 of tensile strength data 100 of the optical fiber 22 being removed of the coating 26 with the laser preparing system 48 using the sets 52(1)-52(3) of the laser scans 54(1)-58(q) of the laser preparing system 48 depicted in FIG. 3A and the tension $F_T$ of 0.5 pounds (3.1 percent of tensile strength) being applied with the tension generator 90. The Weibull cumulative distribution function plot 99 also shows tensile strength data 102 of a pristine optical fiber which has not had its coating removed, and tensile strength data for optical fibers whose coatings 26 were removed using alternative conventional methods. Specifically, the Weibull cumulative distribution function plot 99 provides tensile strength data 104 for conventionally mechanical stripped optical fibers and tensile strength data 106 for conventionally hot gas stripped optical fibers. The data in the Weibull cumulative distribution function plot 99 shows that the process disclosed herein produces optical fibers having an average mean tensile strength above seven-hundred (700) kpsi as shown by tensile strength data 100 which is higher than the mean tensile strength of the optical fibers treated using the hot gas and the mechanical stripping processes represented by the tensile strength data 106, 104, respectively.

Figure 6:
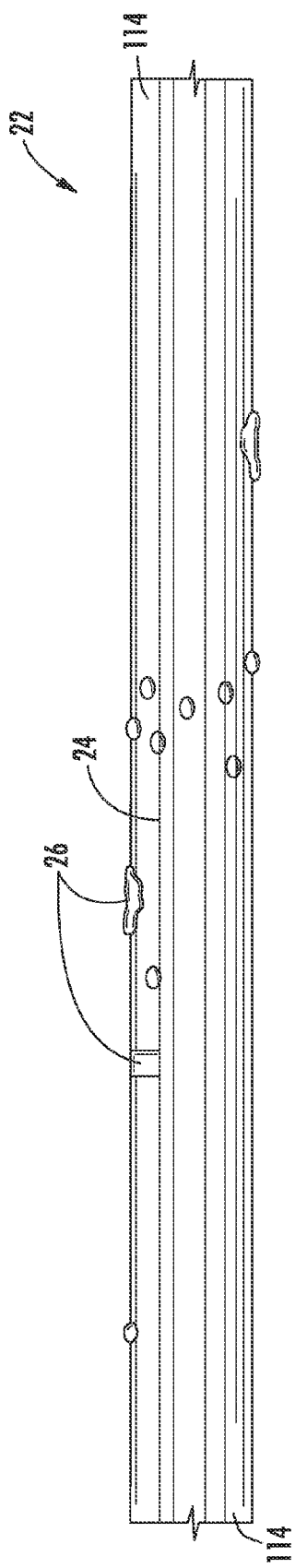
FIG. 6 is a side view of an exemplary optical fiber with a coating mostly removed from a glass portion of the optical fiber.
Figure 8:
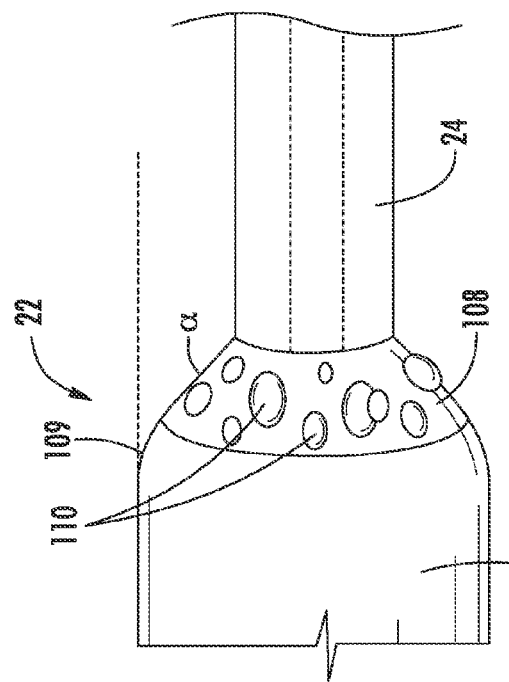
FIG. 8 is a side view of an exemplary optical fiber with the coating removed from an end portion using the laser preparing system of FIG. 4A illustrating physical characteristics of the optical fiber.

Now that tensile strength data has been provided, physical data in the form of actual images of an optical fiber 22 stripped by the laser preparing system 48 show the coating 26 partially removed. Referring now to FIGS. 6 and 8, an optical fiber 22 includes a coated portion covered by a polymer coating 26 (FIG. 8) and a glass portion 24 (FIGS. 6 and 8) where the polymer coating 26 is essentially not present (e.g., removed, fully removed, consists essentially of glass). For example, at least 95% of the exterior surface of the glass portion 24 of the optical fiber is uncovered by the polymer coating (e.g., at least 99%, at least 99.9% of the glass portion 24 is uncovered by the polymer coating 26).

A microstructure of the polymer coating 26, proximate to the glass portion 24, may include indicators of the coating-removal technique by which the optical fiber 22 was processed. In some embodiments, the polymer coating 26, proximate to the glass portion 24, has a taper 108 at an angle α (e.g., constant angle, increasing angle, decreasing angle, average angle; see, e.g., FIG. 8) such that the thickness of the polymer coating decreases toward the glass portion 24 of the optical fiber 22 as a function of proximity to the glass portion 24. The polymer coating 26 has a rounded transition 109 from the portion of the optical fiber 22 fully covered by the polymer coating 26 to the taper 108. Also, in some embodiments, a bulbous portion 111 of the polymer coating 26 may be disposed adjacent to the glass portion 24. The bulbous portion 111 may have a diameter $D_B$ larger than the diameter $D_2$ of the polymer coating 26 further away from the glass portion 24 where the polymer coating 26 has been removed.

Figure 7:
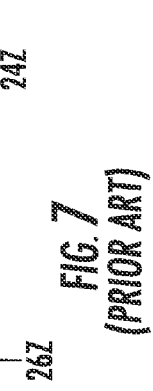
FIG. 7 is a side view of an exemplary optical fiber with a coating partially stripped from a glass portion of the optical fiber using a mechanical stripping process as is known in the art.

The taper 108 and transition of FIG. 8 contrasts with the transition shown for the optical fiber 22z between the polymer coating 26z and glass portion 24z shown in FIG. 7 as known in the art, which may correspond to a microstructure resulting from mechanical stripping. Furthermore, as shown in FIG. 8, the microstructure of the optical fiber 22 of the glass portion 24 does not include surface scrapes 23, as may be caused by a sharp edge during mechanical stripping, and the microstructure of the polymer coating 26 proximate to the glass portion 24 includes an increased volume of trapped bubbles 110 (e.g., visible under twenty times magnification, within the taper 108) relative to the polymer coating 26 further from the glass portion 24.

Figure 9A:
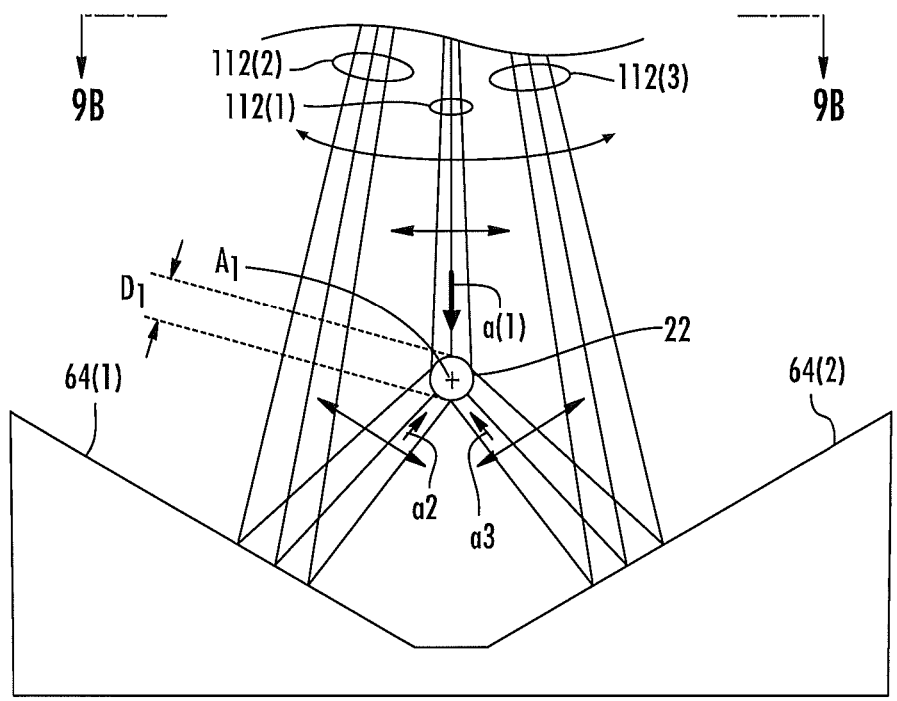
FIG. 9A is a front axial view of an optical fiber within the laser preparing system of FIG. 3A illustrating at least two cleave sets of laser cleave scans used to cleave the optical fiber.
Figure 9B:
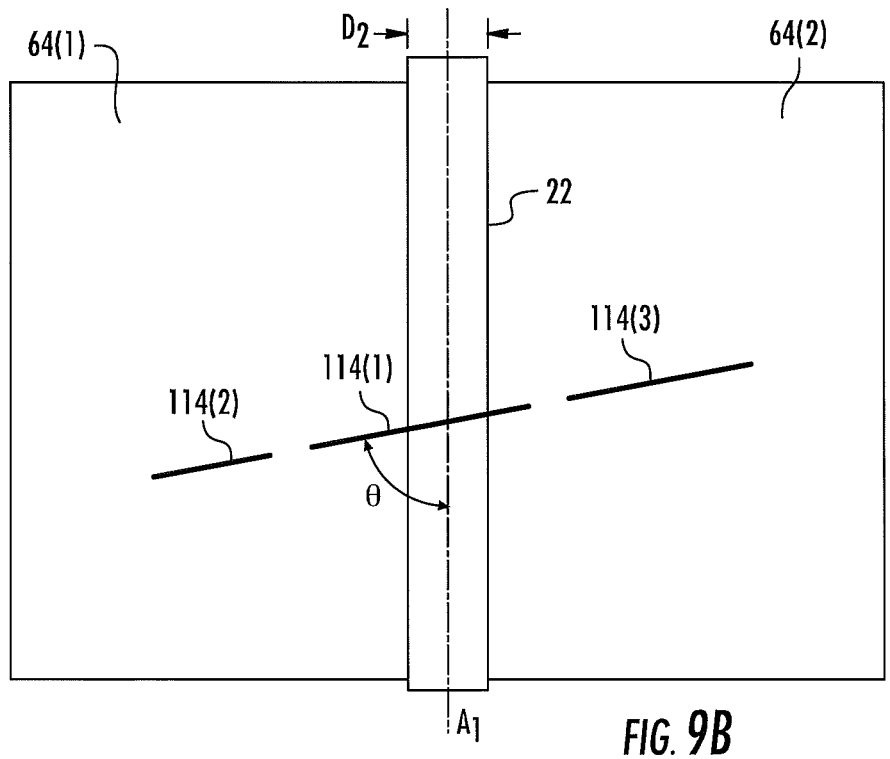
FIG. 9B is a top view of the optical fiber within the system of FIG. 9A illustrating an exemplary trajectory of the laser beam to cleave the optical fiber.

Now that removing the coating 26 from the optical fiber 22 with the laser preparing system 48 has been discussed and compared against alternative stripping methods, details of optionally cleaving the optical fiber 22 with the laser preparing system 48 are now provided. FIGS. 9A and 9B are a front axial view and a top view, respectively, of an optical fiber within the laser preparing system 48. The trajectories of the at least three laser cleave sets 112(1)-112(3) of laser cleave scans 114(1)-114(3) may be similar to the three sets 52(1)-52(3) of laser scans 54(1)-58(q) and so only differences will be discussed in detail for clarity and conciseness. The laser cleave sets 112(1)-112(3) may utilize the laser beam 60 as the sets 52(1)-52(3). A difference is that the pitch distance $L_1$ may be zero (0) and thereby the laser scans 54(1)-54(n) have been combined into the laser cleave scans 114(1); the laser scans 56(1)-56(p) have been combined into the laser cleave scan 114(2); and the laser scans 56(1)-56(p) have been combined into the laser cleave scans 114(3). The laser cleave sets 112(1)-112(3) ablate, melt, vaporize, and/or thermally decompose the optical fiber 22 instead of the coating 26 and thereby cleave the optical fiber 22.

It is also noted that in practice, the spot size $D_S$ of the laser beam 60 may be reduced from those spot size(s) used when removing the coating 26 to provide a higher intensity to minimize the cleaving time. For example, the spot size $D_S$ during cleaving may be between one-hundred (100) microns to five-hundred (500) microns, and preferrably one-hundred forty (140) microns. The power of the laser 74 may also be increased while cleaving in combination with a smaller spot size $D_S$ to provide a higher intensity of the laser beam 60 to minimize cleaving time. In this manner, the laser preparing system 48 may be used to cleave the optical fiber 22 with the same multi-function fixture 78 as used when the coating 26 was removed from the optical fiber 22.

Applying tension $F_T$ is important when cleaving to form the bulletnose shape 42 (FIG. 2B) which makes the optical fiber 22 relatively easy to insert through a ferrule 36 (FIG. 12) and thereby available to establish an optical connection. The bulletnose shape 42 tends to form when tension $F_T$ is applied below a certain threshold, for example, below 9.3 percent of a tensile strength of the optical fiber 22.

Figure 10A:
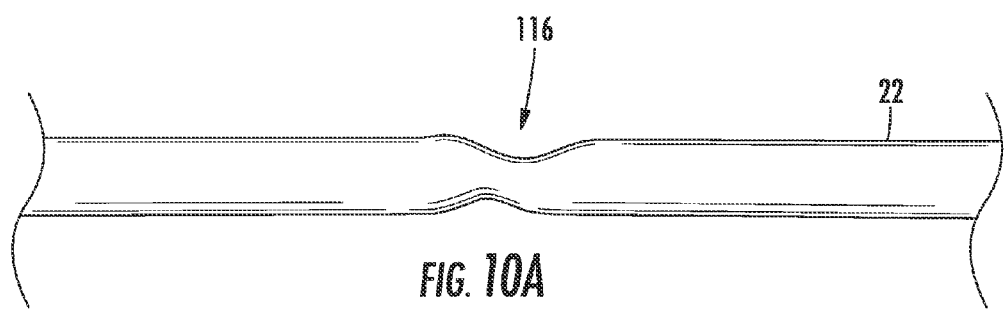
FIG. 10A is a side view of an optical fiber not fully cleaved illustrating a case wherein an energy exposure amount that would normally be sufficient to cleave an optical fiber that is under tension during cleaving may be insufficient to cleave an optical fiber not under tension.
Figure 10B:
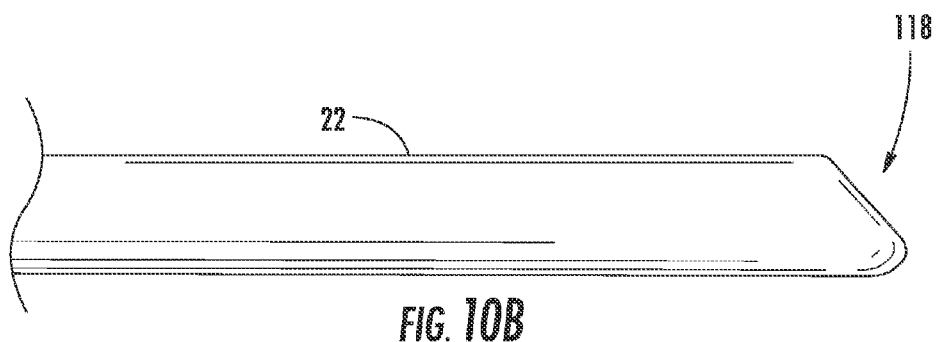
FIG. 10B is a side view of an end portion of an optical fiber illustrating a case where no tension was applied, and by merely increasing the number of passes, an end portion of the optical fiber was asymmetrically formed.

Applying the tension $F_T$ during the cleaving process also reduces the amount of laser energy required to cleave the optical fiber 22. FIG. 10A is a side view of the optical fiber 22 incompletely cleaved, and instead a neck 116 was formed. FIG. 10A illustrates a case where the energy exposure that would ordinarily be sufficient to cleave the optical fiber 22 under a tension $F_T$ of 0.5 pounds (3.1 percent of tensile strength) was insufficient to cleave an optical fiber 22 without tension $F_T$ being applied. If additional laser energy in the form of additional passes of the cleave scans 114(1)-114(3) are incident upon the optical fiber 22 of FIG. 10A, then the cleave will be completed by breaking the neck 116, but the end portion 40 may likely form a non-standard end portion 118 (FIG. 10B) that may be difficult to insert through a ferrule of a fiber optic connector. In summary, applying the tension $F_T$ may reduce the laser energy required to cleave the optical fiber 22 and may facilitate the formation of the bulletnose shape 42 (FIG. 2B) at the end portion 40 of the optical fiber 22.

Details of the laser preparing system 48 to remove coating 26 and cleave the optical fiber 22 have been discussed. Alternative embodiments of the tension generator 90 of the multi-function fixture 78 will be discussed relative to multi-function fixtures 78A-78E of FIGS. 11A-11E, respectively. In this regard, the multi-function fixtures 78A-78E may be similar to the multi-function fixture 78 and so only differences will be discussed in detail for clarity and conciseness.

Figure 11A:
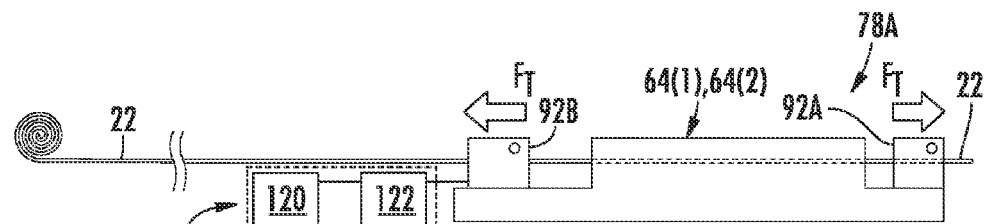
FIGS. 11A-11E are left side views of different embodiments of the multi-function fixture of FIG. 4B illustrating different embodiments of a tension generator as a motor and force gauge combination, a torque motor, an air pressure cylinder, a weight and pulley system, and a weight and lever arm system, respectively.

FIG. 11A depicts the multi-function fixture 78A including a tension generator 90A including a motor 120 in combination with a force gauge 122. In one embodiment the motor 120 may be an electric motor which applies a force $F_T$ to the moveable fiber holder 92B. The moveable fiber holder 92B is removably secured to the optical fiber 22 and thereby the force $F_T$ becomes the tension $F_T$ applied to the optical fiber 22 during the removal of the coating 26 and the cleaving of the optical fiber 22. As discussed above and depicted in FIG. 3E, tensile strength of the optical fiber 22 may be increased when the tension $F_T$ is applied to the optical fiber 22 during removal of the coating 26 with the laser preparing system 48. In this manner, the tensile strength of the optical fiber 22 may be improved by using the multi-function fixture 78A.

Figure 11B:
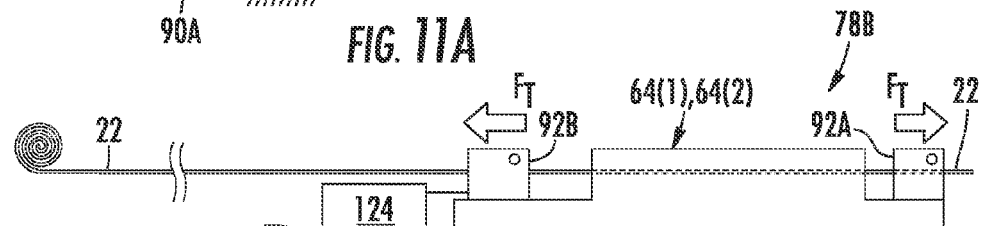

FIG. 11B depicts the multi-function fixture 78B including a tension generator 90B including a torque motor 124 which applies a force $F_T$ to the moveable fiber holder 92B. The moveable fiber holder 92B is removably secured to the optical fiber 22 and thereby the force $F_T$ becomes the tension $F_T$ applied to the optical fiber 22 during the removal of the coating 26 and the cleaving of the optical fiber 22. As discussed above and depicted in FIG. 3E, average tensile strength of the optical fiber 22 may be increased when the tension $F_T$ is applied to the optical fiber 22 during removal of the coating 26 with the laser preparing system 48. In this manner, the tensile strength of the optical fiber 22 may be improved by using the multi-function fixture 78B.

Figure 11C:
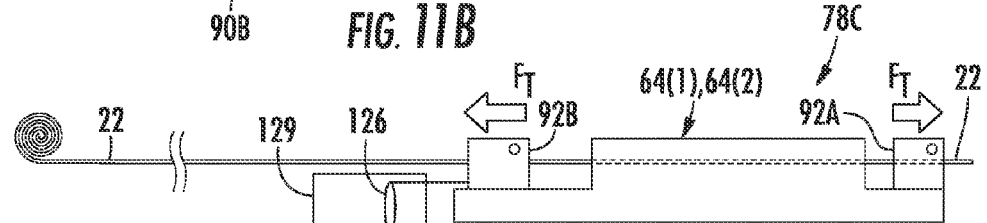

FIG. 11C depicts the multi-function fixture 78C including a tension generator 90C including a piston 126 powered by input air pressure 128 within an air cylinder 129. The input air pressure 128 applies a force $F_T$ via the piston 126 to the moveable fiber holder 92B. The moveable fiber holder 92B is removably secured to the optical fiber 22 and thereby the force $F_T$ becomes the tension $F_T$ applied to the optical fiber 22 during the removal of the coating 26 and the cleaving of the optical fiber 22. As discussed above and depicted in FIG. 3E, average tensile strength of the optical fiber 22 may be increased when the tension $F_T$ is applied to the optical fiber 22 during removal of the coating 26 with the laser preparing system 48. In this manner, the tensile strength of the optical fiber 22 may be improved by using the multi-function fixture 78C.

Figure 11D:
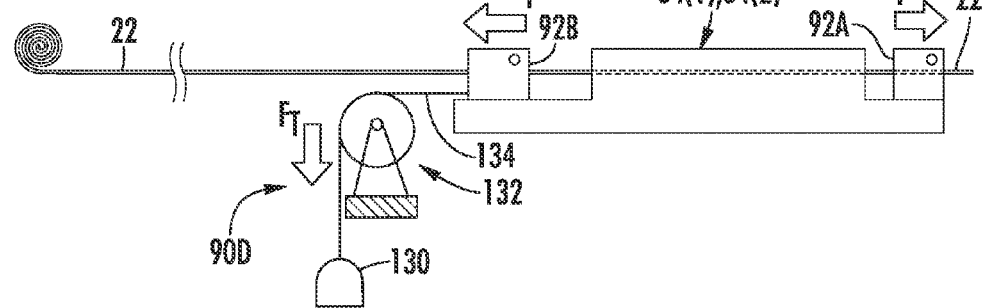

FIG. 11D depicts the multi-function fixture 78D including a tension generator 90D including a mass 130 of weight $F_T$ suspended from a pulley 132 with a wire 134 attached to the moveable fiber holder 92B. The mass 130 applies a force $F_T$ via the wire 134 to the moveable fiber holder 92B. The moveable fiber holder 92B is removably secured to the optical fiber 22 and thereby the force $F_T$ becomes the tension $F_T$ applied to the optical fiber 22 during the removal of the coating 26 and the cleaving of the optical fiber 22. As discussed above and depicted in FIG. 3E, average tensile strength of the optical fiber 22 may be increased when the tension $F_T$ is applied to the optical fiber 22 during removal of the coating 26 with the laser preparing system 48. In this manner, the tensile strength of the optical fiber 22 may be improved by using the multi-function fixture 78D.

Figure 11E:
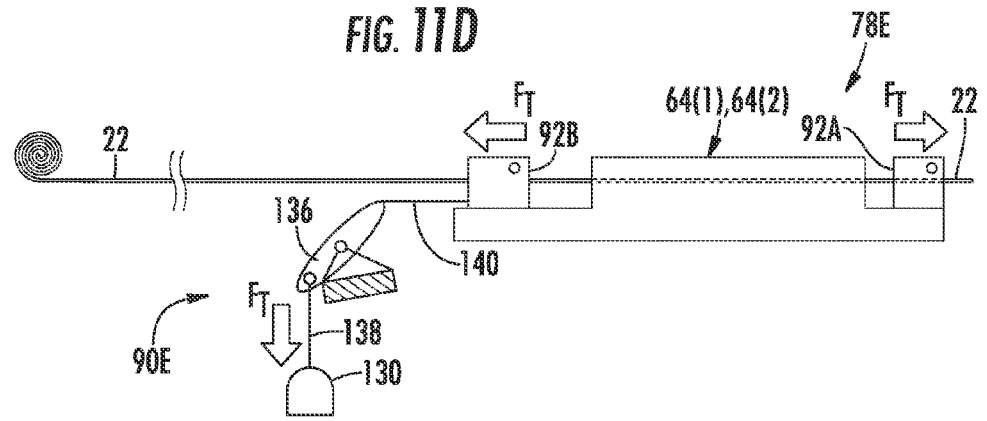

FIG. 11E depicts the multi-function fixture 78E including a tension generator 90E including the mass 130 of weight $F_T$ suspended from a lever arm 136 with a first wire 138. A second wire 140 is connected to the lever arm 136 opposite to the first wire 138. The second wire 140 is attached to the moveable fiber holder 92B. The mass 130 applies a force $F_T$ via the first wire 138 to the lever arm 136 which is transferred by the second wire 140 to the moveable fiber holder 92B. The moveable fiber holder 92B is removably secured to the optical fiber 22 and thereby the force $F_T$ becomes the tension $F_T$ applied to the optical fiber 22 during the removal of the coating 26 and the cleaving of the optical fiber 22. As discussed above and depicted in FIG. 3E, average tensile strength of the optical fiber 22 may be increased when the tension $F_T$ is applied to the optical fiber 22 during removal of the coating 26 with the laser preparing system 48. In this manner, the tensile strength of the optical fiber 22 may be improved by using the multi-function fixture 78E.

Figure 12:
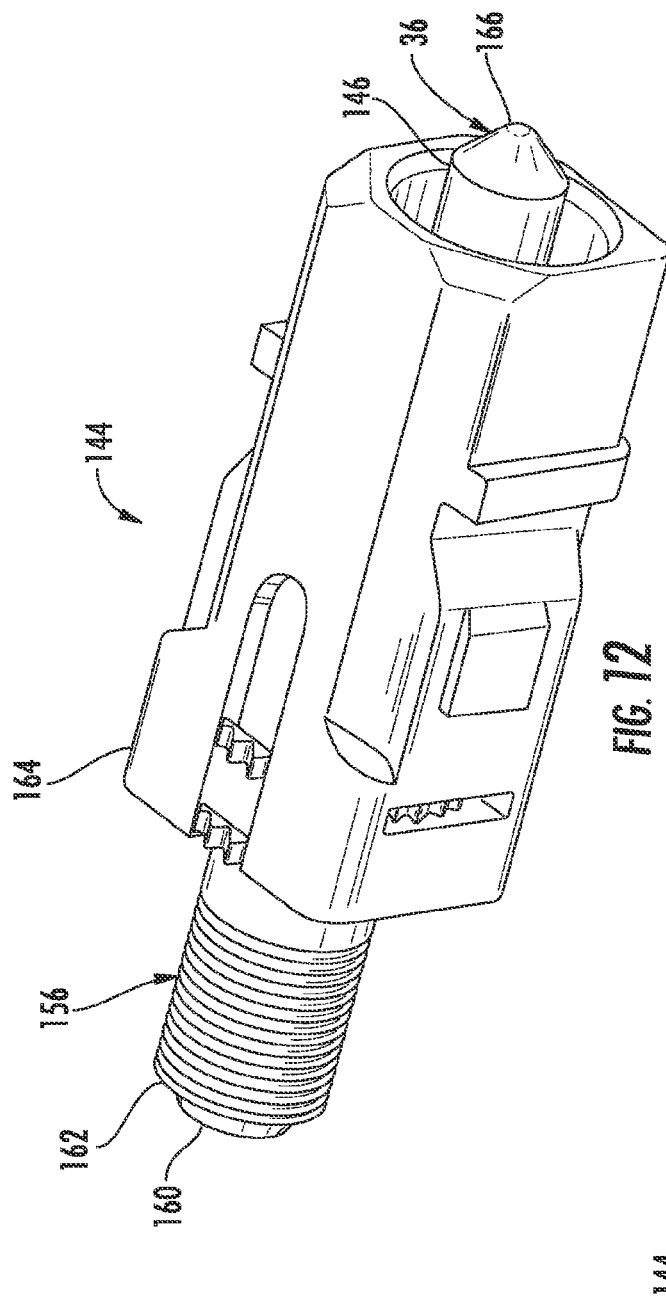
FIG. 12 is perspective view of an exemplary fiber optic connector sub-assembly ("connector")
Figure 13:
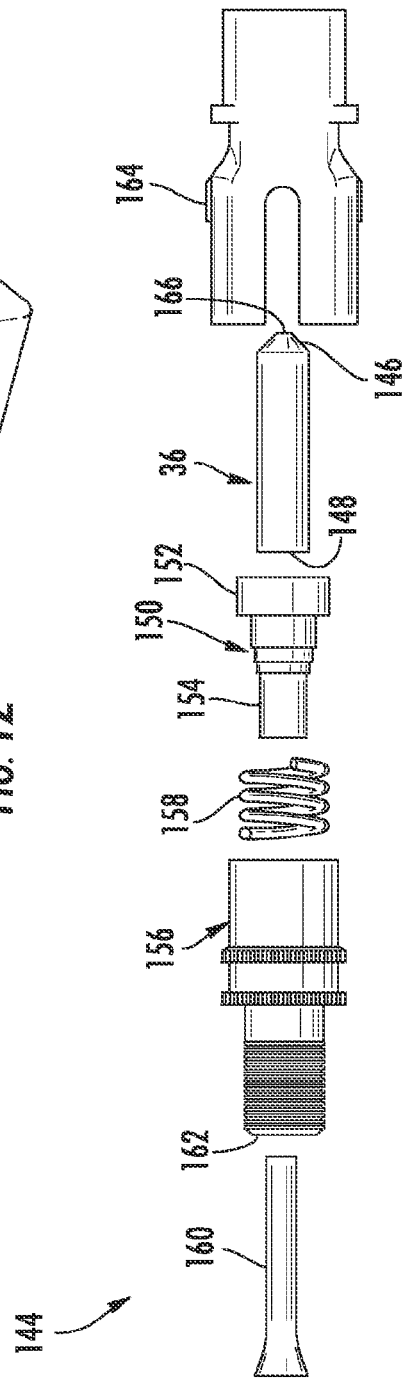
FIG. 13 is an exploded side view of the connector of FIG. 12.
Figure 14:
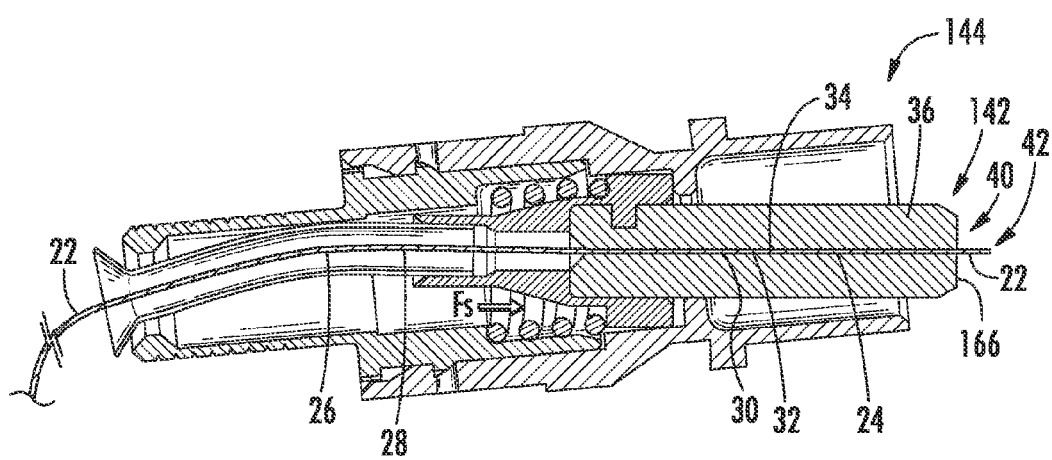
FIG. 14 is a cross-sectional side view of the fiber optic cable of FIG. 2A and connector of FIG. 12 forming an exemplary connectorized fiber optic cable assembly, wherein the optical fiber of the fiber optic cable is coupled to a ferrule of the connector.

The laser preparing system 48 has been discussed above along with the optical fiber 22 having the end portion 40 stripped and cleaved. Now the optical fiber 22 may be ready to be installed into the ferrule 36 to precisely locate the optical fiber 22 so that fiber optic connections may be established. An exemplary fiber optic connector sub-assembly 144 (hereinafter "connector 144") including the ferrule 36 is shown in FIGS. 12 and 13, and an exemplary connectorized fiber optic assembly 142 including the optical fiber 22 and connector 144 is shown in FIG. 14. Although connector 144 is shown in the form of a SC-type connector, the present disclosure may be applicable to processes and connectorized fiber optic assemblies involving different connector designs. This includes ST, LC, FC, MU, MT, and MTP-style connectors, for example.

As shown in FIGS. 12 and 13, the connector 144 includes the ferrule 36 having a mating end 146 and an insertion end 148, a ferrule holder 150 having opposed first and second end portions 152, 154, and a housing 156. The insertion end 148 of the ferrule 36 is received in the first end portion 152 of the ferrule holder 150 while the mating end 146 remains outside the ferrule holder 150. The second end portion 154 of the ferrule holder 150 is received in the housing 156. A spring 158 may be disposed around the second end portion 154 and configured to interact with walls of the housing 156 to bias the ferrule holder 150 (and ferrule 36). Additionally, a lead-in tube 160 may extend from a rear end 162 of the housing 156 to within the second end portion 154 of the ferrule holder 150 to help guide the insertion of the optical fiber 22 into the ferrule bore 34. An outer shroud 164 is positioned over the assembled ferrule 36, ferrule holder 150, and housing 156, with the overall configuration being such that the mating end 146 of the ferrule 36 presents an end face 166 configured to contact a mating component (e.g., another fiber optic connector; not shown).

FIG. 14 depicts the optical fiber 22 inserted through the ferrule bore 34 of the ferrule 36 to form the connectorized fiber optic cable assembly 142. The insertion may be made relatively easy by the bulletnose shape 42 at the end portion 40 of the optical fiber 22 which precisely guides the optical fiber 22 through inner surfaces of the connector 144. In this embodiment, the first lengthwise portion 28 of the optical fiber 22 is not stripped and the coating 26 protects the optical fiber 22 up to the ferrule bore 34 but does not enter the ferrule bore 34. It is noted that the second lengthwise portion 30 has been stripped of the coating 26 and is inserted into the ferrule bore 34. In this manner, the mechanical properties of the coating 26 do not interfere with the interface between the ferrule 36 and the glass portion 24 of the second lengthwise portion 30. In addition, the glass portion 24 may be easily located relative to the ferrule 36 so that optical connections may be more easily established once the bulletnose shape 42 at the end portion 40 is processed, with for example mechanical grinding, to a final optical shape.

Now that the laser preparing system 48 and the connectorized fiber optic cable assembly 142 has been introduced above, an exemplary process 170 of laser preparing the end portion 40 of an optical fiber 22 will be discussed below where laser scans are positioned to intersect the optical axis $A_1$ of the optical fiber 22 at a plurality of radial positions a(1)-a(n) to efficiently remove the coating 26 while retaining the tensile strength of the optical fiber 22.

Figure 15:
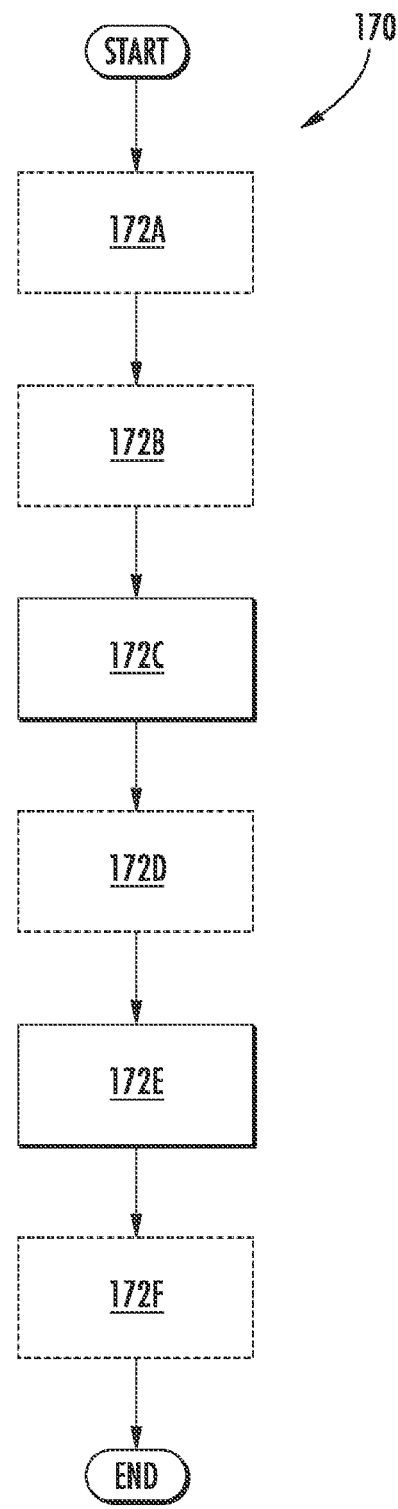
FIG. 15 is a flowchart diagram of an exemplary process of laser preparing the end portion of the optical fiber.

In this regard, FIG. 15 provides a flowchart diagram illustrating an exemplary process 170 that may be employed to laser prepare the end portion 40 of an optical fiber 22. The flowchart diagram includes blocks 172A-172F to describe the exemplary process 170. Blocks which are optional are depicted in broken (dashed) lines for convenient reference. The terminology and reference characters introduced above will be utilized in the related discussion below for continuity, clarity and conciseness.

With reference back to FIG. 4A, the tension $F_T$ may be applied to the optical fiber 22 between one (1) percent and fifty (50) percent of a tensile strength of the optical fiber 22 with the tension generator 90 (Block 172A of FIG. 15). FIG. 4A also depicts that the laser 74 may be maintained stationary with respect to the optical fiber 22 (Block 172B of FIG. 15). The laser 74 may be maintained stationary during the removing of at least the portion 27 of the coating 26. In this manner, the optical fiber 22 may be readied for removal of the portion 27 of the coating 26.

FIG. 4A further depicts emitting the laser beam 60 from the laser 74 (Block 172C of FIG. 13). FIG. 4A also depicts the laser beam 60 may be simultaneously controlled in the X, Y, and Z directions with the control system 76 (Block 172D of FIG. 15). The control system 76 may comprise the galvanometer scanner 81. In this manner, the laser beam 60 may be readied for removal of the portion 27 of the coating 26.

FIGS. 3A through 3B-4 depicts removing the at least a portion 27 of the coating 26 from the end portion 40 of the optical fiber 22 (Block 172E of FIG. 15). The laser beam 60 is deflected at an angle θ (theta) repeatedly across the optical axis $A_1$ of the optical fiber 22 with the control system 76 to form the at least two sets 52(1)-52(3) of the laser scans 54(1)-58(q). The laser beam 60 may be deflected at different effective focal lengths (FIG. 3C) or associated spot sizes $D_S$ while forming at least one of the sets 52(1)-52(3) of the laser scans 54(1)-58(q). Further, the control system 76 may separate the laser scans 54(1)-58(q) of each of the at least two sets 52(1)-52(3) of the laser scans 54(1)-58(q) by the pitch distance $L_1$ (FIG. 3B-1) along the optical axis $A_1$ of the optical fiber 22. The pitch distance $L_1$ may be between twenty-five (25) microns and one-hundred fifty (150) microns. The angle θ (theta) may be in a range from forty-five (45) degrees to ninety (90) degrees relative to the optical axis $A_1$ of the optical fiber 22.

With continued reference to FIGS. 3A through 3B-4 in regards to removing the at least the portion 27 of the coating 26, the laser beam 60 is directed with the control system 76 to position respective scans of the sets 52(1)-52(3) of laser scans 54(1)-58(q) to intersect the optical axis $A_1$ of the optical fiber 22 at the radial positions a(1)-a(3). The radial positions a(1)-a(3) are equally distributed or substantially equally distributed about the circumference of the optical fiber 22. The laser beam 60 may be directed to the at least one reflector 64(1), 64(2) to deflect the laser beam 60 to position respective scans of at least one of the sets 52(1)-52(3) of laser scans 54(1)-58(q) to intersect the optical axis $A_1$ of the optical fiber 22 at one or more of the radial positions a(1)-a(3). There may be different passes 76(1)-76(z) of the laser beam 60 to form the sets 52(1)-52(3) of laser scans 54(1)-58(q) and the spot size $D_S$ of the laser beam 60 may be changed to form the sets 52(1)-52(3) of laser scans 54(1)-58(q) for a subsequent pass of the laser beam 60 as one approach to change energy intensity incident upon the optical fiber 22. In this manner, the sets 52(1)-52(3) of laser scans 54(1)-58(q) may provide a uniform or substantially uniform cumulative energy intensity incident around the circumference of the optical fiber 22 while efficiently removing the coating 26.

FIGS. 9A-9B depicts the process 170 may optionally further comprise cleaving the end portion 40 of the optical fiber 22 (Block 172F of FIG. 15). The cleaving occurs by removing at least a portion 29 of the circumference of the optical fiber 22 by deflecting the laser beam 60 at the angle θ (theta) repeatedly across the optical axis $A_1$ of the optical fiber 22 with the control system 76 to form the laser cleave sets 112(1)-112(3) of the laser cleave scans 114(1)-114(3). The cleaving also includes directing the laser beam 60 with the control system 76 to position respective laser cleave scans of the at least two laser cleave sets 112(1)-112(3) of laser cleave scans 114(1)-114(3) to intersect the optical axis $A_1$ of the optical fiber 22 at the radial positions a(1)-a(3). The laser 74 may be maintained stationary with respect to the optical fiber 22 during the cleaving the end portion 40 of the optical fiber 22. In this manner, the complexity of the laser preparing system 48 may be reduced.

Moreover, the laser beam 60 may be directed to the at least one reflector 64(1), 64(2) in order to deflect the laser beam 60 to position respective laser cleave scans of at least one of the at least two laser cleave sets 112(1)-112(3) of the laser cleave scans 114(1)-114(3) to intersect the optical axis $A_1$ of the optical fiber 22 at one or more of the radial positions a(1)-a(3). The tension $F_T$ may be applied to the optical fiber 22 during the cleaving. The tension $F_T$ applied during the cleaving may be between one (1) percent and fifty (50) percent of the tensile strength of the optical fiber 22. In this manner, the laser beam 60 may be cleaved at the end portion 40 of the optical fiber 22 and a bulletnose shape 42 may be formed at the end portion 40 to permit the optical fiber 22 to be more easily inserted through the ferrule 36.

Figure 16A:
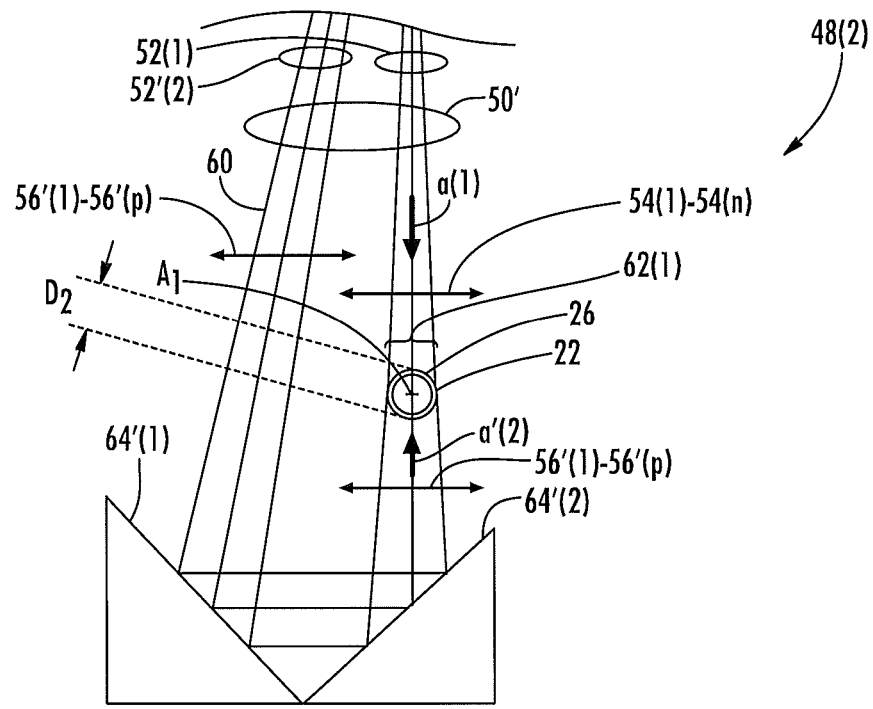
FIG. 16A is a front axial view the optical fiber within an alternative laser preparing system which is another embodiment of the laser preparing system of FIG. 4A, to illustrate exemplary pathways of two sets of laser scans formed by a laser beam as the sets of laser scans are deflected across the optical axis of the optical fiber and directed to be at different radial positions to remove a coating of the optical fiber.
Figure 16B:
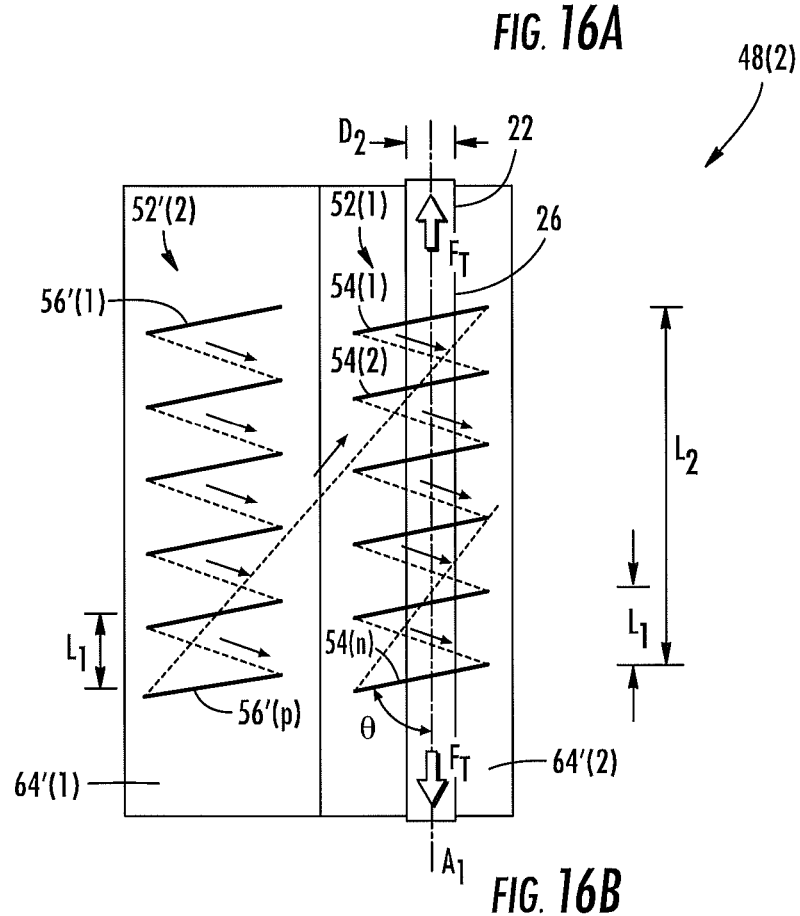
FIG. 16B is a top view of the optical fiber within the laser preparing system of FIG. 16A illustrating an exemplary trajectory of the laser beam.

Now that the exemplary process 170 that may be employed to laser prepare the end portion 40 of an optical fiber 22 has been introduced, another embodiment of the laser preparing system 48 is described. FIG. 16A is a front axial view of the optical fiber 22 within an alternative laser preparing system 48(2) which is another embodiment of the laser preparing system 48 of FIG. 4A, to illustrate exemplary pathways 50' comprising two sets 52(1), 52'(2) of laser scans 54(1)-54(n), 56'(1)-56'(p) formed by a laser beam 60. FIG. 16B is a top view of the optical fiber 22 within the laser preparing system 48(2) of FIG. 16A illustrating an exemplary trajectory of the laser beam 60. The laser preparing system 48(2) is similar to the laser preparing system 48 and accordingly only differences will be discussed in the interests of clarity and conciseness.

The laser preparing system 48(2) is configured to deflect the laser beam 60 at the angle θ (theta) repeatedly across the optical axis $A_1$ of the optical fiber 22 to form the sets 52(1), 52'(2) of laser scans 54(1)-54(n), 56'(1)-56'(p). The laser beam 60 is directed to position respective scans of the sets 52(1), 52'(2) of laser scans 54(1)-54(n), 56'(1)-56'(p) to intersect the optical axis $A_1$ of the optical fiber 22 at radial positions a(1), a'(2). The radial positions a(1), a'(2) are equally distributed or substantially equally distributed one-hundred eighty (180) degrees about the circumference of the optical fiber 22. In this manner, the coating 26 may be removed from the optical fiber 22 and/or be cleaved.

It is noted that the set 52'(2) containing the laser scans 56'(1)-56'(p) is directed to at least one reflector 64'(1), 64'(2) to deflect the laser beam 60 to position the laser scans 56'(1)-56'(p) to intersect the optical axis $A_1$ of the optical fiber 22 at the radial position a'(2). In this manner, the radial positions a(1), a'(2) may be distributed about the circumference of the optical fiber 22.

As used herein, it is intended that terms "fiber optic cables" and/or "optical fibers" include all types of single mode and multi-mode light waveguides, including one or more optical fibers that may be upcoated, uncoated, coated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. Non-limiting examples of bend-insensitive, or bend resistant, optical fibers are ClearCurve® Multimode or single-mode fibers commercially available from Corning Incorporated. Suitable fibers of these types are disclosed, for example, in U.S. Patent Application Publication Nos. 2008/0166094 and 2009/0169163, the disclosures of which are incorporated herein by reference in their entireties.

Many modifications and other variations of the embodiments set forth herein will come to mind to one skilled in the art to which the embodiments pertain having the benefit of the teachings presented in the foregoing descriptions and the associated drawings. For example, the coating 26 may be removed from a mid-point portion of the optical fiber 22 with the laser preparing system 48 as opposed to the end portion 40 of the optical fiber 22.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A method of laser preparing an end portion of an optical fiber, comprising:
   emitting a laser beam from a laser;
   removing at least a portion of a coating from an end portion of an optical fiber by:
      deflecting the laser beam at an angle theta repeatedly across an optical axis of the optical fiber with a control system to form at least two sets of laser scans; and
      directing the laser beam with the control system to position respective scans of the at least two sets of laser scans to intersect the optical axis of the optical fiber at a plurality of radial positions; and
   cleaving the end portion of the optical fiber by:
      removing at least a portion of the circumference of the optical fiber by deflecting the laser beam at an angle repeatedly across the optical axis of the optical fiber with the control system; and
      directing the laser beam with the control system to position respective laser cleave scans of the at least two cleave sets of laser cleave scans to intersect the optical axis of the optical fiber at the plurality of radial positions.

2. The method of claim 1, wherein the at least two sets of laser scans provide a uniform or substantially uniform cumulative energy intensity incident around the circumference of the optical fiber.

3. The method of claim 1, further comprising maintaining the laser stationary with respect to the optical fiber during the removing the at least the portion of the coating.

4. The method of claim 1, wherein the directing the laser beam to position the at least two sets of laser scans comprises directing the laser beam to at least one reflector to deflect the laser beam to position the respective scans of at least one of the at least two sets of laser scans to intersect the optical axis of the optical fiber at one or more of the plurality of radial positions.

5. The method of claim 1, further comprising maintaining the laser stationary with respect to the optical fiber during the cleaving the end portion of the optical fiber.

6. The method of claim 1, wherein the directing the laser beam to position the at least two cleave sets of laser cleave scans comprises directing the laser beam to at least one reflector to deflect the laser beam to position the respective laser cleave scans of at least one of the at least two cleave sets of laser cleave scans to intersect the optical axis of the optical fiber at one or more of the plurality of radial positions.

7. The method of claim 1, wherein the deflecting the laser beam with the control system includes deflecting the laser beam at two different spot sizes while forming at least one of the at least two sets of laser scans.

8. The method of claim 1, wherein the angle theta is in a range from forty-five (45) degrees to ninety (90) degrees relative to the optical axis of the optical fiber.

9. The method of claim 1, further comprising changing a spot size of the laser beam to form the at least two sets of laser scans for a subsequent pass of the laser beam.

10. The method of claim 1, further comprising applying a tension to the optical fiber between one (1) percent and fifty (50) percent of a tensile strength of the optical fiber with a tension generator.

11. A method of laser preparing an end portion of an optical fiber, comprising:
    emitting a laser beam from a laser; and
    removing at least a portion of a coating from an end portion of an optical fiber by:
       deflecting the laser beam at an angle theta repeatedly across an optical axis of the optical fiber with a control system to form at least two sets of laser scans, wherein the deflecting with the control system;
       directing the laser beam with the control system to position respective scans of the at least two sets of laser scans to intersect the optical axis of the optical fiber at a plurality of radial positions; and
       changing a spot size of the laser beam to form the at least two sets of laser scans for a subsequent pass of the laser beam.

12. The method of claim 11, wherein changing the spot size of the laser beam comprises increasing the spot size of the laser beam to form the at least two sets of laser scans for the subsequent pass of the laser beam.

13. The method of claim 12, further comprising increasing a focal length of the laser beam to form the at least two sets of laser scans for the subsequent pass of the laser beam.

14. The method of claim 11, further comprising changing one of a power, power density, power distribution, and wavelength of the laser beam to form the at least two sets of laser scans for the subsequent pass of the laser beam.

15. The method of claim 11, further comprising forming a portion of each of the at least two sets of laser scans before completely forming any set of the at least two sets of laser scans.

16. The method of claim 11, wherein the at least two sets of laser scans provide a uniform or substantially uniform cumulative energy intensity incident around the circumference of the optical fiber.

17. The method of claim 11, wherein the directing the laser beam to position the at least two sets of laser scans comprises directing the laser beam to at least one reflector to deflect the laser beam to position the respective scans of at least one of the at least two sets of laser scans to intersect the optical axis of the optical fiber at one or more of the plurality of radial positions.

18. The method of claim 11, wherein the deflecting the laser beam with the control system includes deflecting the laser beam at two different spot sizes while forming at least one of the at least two sets of laser scans.

19. The method of claim 11, wherein the angle theta is in a range from forty five (45) degrees to ninety (90) degrees relative to the optical axis of the optical fiber.

20. The method of claim 11, further comprising applying a tension to the optical fiber between one (1) percent and fifty (50) percent of a tensile strength of the optical fiber with a tension generator.

* * * * *